(12) United States Patent
Wang

(10) Patent No.: US 7,783,836 B2
(45) Date of Patent: Aug. 24, 2010

(54) SYSTEM AND METHOD FOR CACHE MANAGEMENT

(75) Inventor: Qufei Wang, 334-291 Windermere Road, London, ON (CA) N6G 2J9

(73) Assignee: Qufei Wang, Toronto (CA)

( * ) Notice: Subject to any disclaimer, the term of this patent is extended or adjusted under 35 U.S.C. 154(b) by 721 days.

(21) Appl. No.: 11/611,670

(22) Filed: Dec. 15, 2006

(65) Prior Publication Data
US 2007/0198779 A1 Aug. 23, 2007

Related U.S. Application Data

(60) Provisional application No. 60/750,781, filed on Dec. 16, 2005.

(51) Int. Cl.
*G06F 12/00* (2006.01)
(52) U.S. Cl. ...................................... 711/133
(58) Field of Classification Search .................. None
See application file for complete search history.

(56) References Cited

U.S. PATENT DOCUMENTS

| | | | |
|---|---|---|---|
| 5,353,425 A | | 10/1994 | Malamy et al. |
| 5,692,152 A | * | 11/1997 | Cohen et al. ............. 711/140 |
| 5,749,089 A | * | 5/1998 | Yoshizawa et al. ........ 711/127 |
| 5,822,760 A | * | 10/1998 | Yoshizawa et al. ........ 711/137 |
| 6,601,143 B1 | | 7/2003 | Lamparter |
| 2003/0225974 A1 | | 12/2003 | Bopardickar et al. |
| 2004/0083341 A1 | | 4/2004 | Robinson et al. |
| 2006/0282620 A1 | | 12/2006 | Kashyap et al. |

OTHER PUBLICATIONS

Qufei Wang, WLRU CPU Cache Replacement Algorithm, The University of Western Ontario Department of Computer Science http://www.csd.uwo.ca/Talks/PhDDec14_130_06.shtml, Dec. 14, 2006, Canada.
W. Effelsberg, T. Hearder, Principles of Database Buffer Management, ACM Transactions on Database Systems, vol. 9, No. 4, Dec. 1984, pp. 560-595.
John T. Robinson, Murthy V. Devarakonda, Data Cache Management Using Frequency-Based Replacement, Proceedings of the 1990 ACM SIGMETRICS conference on Measurement and modeling of computer systems, 1990, New York, pp. 134-142.

(Continued)

*Primary Examiner*—Brian R Peugh
(74) *Attorney, Agent, or Firm*—Bereskin and Parr LLP/S.E.N.C.R.L., s.r.l.

(57) ABSTRACT

Aspects of the invention relate to improvements to the Least Recently Used (LRU) cache replacement method. Weighted LRU (WLRU) and Compact Weighted LRU (CWLRU) are CPU cache replacement methods that have superior hit rates to LRU replacement for programs with poor locality, such as network protocols and applications. WLRU assigns weights to cache lines and makes replacement decision by comparing weights. When a cache line is first brought into the cache, it is assigned an initial weight. Weights of cache lines in WLRU increase when hit and decrease when not hit. Weights in WLRU also have upper limits, and the weight of a cache line never increases beyond the upper limit. CWLRU is a more space-efficient implementation of WLRU. Compared to WLRU, CWLRU uses fewer bits per cache line to store the weight.

17 Claims, 22 Drawing Sheets

OTHER PUBLICATIONS

Yuanyuan Zhou, Zhifeng Chen, Kai Li, Second-Level Buffer Cache Management, IEEE Transactions on Parallel and Distributed Systems, vol. 15, No. 6, Jun. 2004.

W. A. Wong, J. L. Baer, Modified LRU Policies for Improving Second-Level Cache Behavior, Proc Sixth Int'l Symp. High-Performance Computer Architecture, Jan. 2000, Seattle, WA.

A. J. Smith, Cache Memories, ACM Computer Survey, vol. 14, No. 3, Sep. 1982.

P. J. Denning, The Working Set Model for Program Behavior, Communications of the ACM, vol. 11, No. 5, May 1968, pp. 323-333.

Yannis Smaragdakis, Scott Kaplan, Paul Wilson, EELRU: Simple and Effective Adaptive Page Replacement, Proceedings of the 1999 ACM SIGMETRICS International Conference on Measurement and Modeling of Computer Systems, pp. 122-133, 1999, Atlanta, Georgia, United States.

Elizabeth J. O'Neil, Partick E. O'Neil, Gerhard Weikum, The LRU-K Page Replacement Algorithm for Database Disk Buffering, Proceedings of the 1993 ACM SIGMOD International Conference on Management of Data, pp. 297-306, May 25-28, 1993, Washington, D.C., United States.

D. Lee, J. Choi, J. H. Kim, S. H. Noh, S. L. Min, Y. Cho, C. S. Kim, LRFU: A Spectrum of Policies that Subsumes the Least Recently Used and Least Frequently Used Policies, IEEE Transactions on Computers, vol. 50, No. 12, pp. 1352-1361, Dec. 2001.

Song Jiang, Xiaodong Zhang, LIRS: An Efficient Low Inter-Reference Recency Set Replacement Policy to Improve Buffer Cache Performance, Proceedings of the 2002 ACM SIGMETRICS International Conference on Measurement and Modeling of Computer Systems, Jun. 15-19, 2002 Marina Del Rey, California.

Theodore Johnson, Dennis Shasha, 2Q: A Low Overhead High Performance Buffer Management Replacement Algorithm, Proceedings of the 20$^{th}$ International Conference on Very Large Data Bases, pp. 439-450, Sep. 12-15, 1994, Santiago, Chile.

Yuanyuan Zhou, James Philbin, Kai Li, The Multi-Queue Replacement Algorithm for Second Level Buffer Caches, Proceedings of the General Track: 2001 USENIX Annual Technical Conference, pp. 91-104, Jun. 25-30, 2001.

Z Chen, Y. Zhou, K. Li, Eviction-Based Cache Placement for Storage Caches, Proceedings of the General Track, 2003 USENIX Annual Technical Conference, Jun. 9-14, 2003, San Antonio, Texas, pp. 269-281.

Bonchi et al, "Data Mining for Intelligent Web Caching", pp. 599-603.

Bonchi et al, "Data Mining for Intelligent Web Caching", pp. 599-603, (c) IEEE, 2001.

* cited by examiner

|  | VALID <1> | DIRTY <1> | TAG <19> | WEIGHT <8> | DATA <256> |
|---|---|---|---|---|---|
| line0 | | | | | |
| line1 | | | | | |
| line2 | | | | | |
| line3 | | | | | |
| line4 | | | | | |
| line5 | | | | | |
| line6 | | | | | |
| line7 | | | | | |

Columns labeled 210, 220, 230, 240, 250 respectively. Overall structure reference 250.

FIG. 2

Step: 0 1 2 3 4 5 6 7 8 9 10 11 12 13 14 15 16 17 18 19 20 21

Reference Sequence: A B C A B D H E F A C G B H A B K A C J L B

LRU: 14 misses

| A | B | C | A | B | D | H | E | F | A | C | G | B | H | A | B | K | A | C | J | L | B |
|---|---|---|---|---|---|---|---|---|---|---|---|---|---|---|---|---|---|---|---|---|---|
|   | A | B | C | A | B | D | H | E | F | A | C | G | B | H | A | B | K | A | C | J | L |
|   |   | A | B | C | A | B | D | H | E | F | A | C | G | B | H | A | B | K | A | C | J |
|   |   |   |   |   | C | A | B | D | H | E | F | A | C | G | B | H | A | B | K | A | C |

↑ top                                                                 ↑ bottom

Replaced:           C A B D H E F A C G   H B K A

WLRU: (with weight formula l6r8b1) 10 misses

| A,1 | B,1 | C,1 | A,6 | B,6 | B,5 | B,4 | B,3 | B,2 | A,7 | A,6 | A,5 | B,6 | B,5 | A,8 | B,8 | B,7 | A,8 | A,7 | A,6 | A,5 | B,8 |
| A,0 | B,0 | C,1 | B,0 | A,5 | A,4 | A,3 | A,2 | A,1 | B,1 | C,1 | G,1 | A,4 | A,3 | B,4 | A,7 | A,6 | B,6 | B,5 | B,4 | B,3 | A,4 |
|     | A,0 | B,0 | C,0 | C,0 | D,1 | H,1 | F,1 | E,1 | F,0 | B,0 | C,0 | G,0 | H,1 | H,0 | K,1 | H,0,K,1 | A,6 | B,4 | J,1 | L,1 | L,0 |
|     |     | A,0 |     |     | C,0 | D,0 | H,0 | H,0 | E,0 | E,0 | B,0 | C,0 | G,0 | G,0 | H,0 | H,0 | K,0 | C,1 | C,0 | J,0 | J,0 |

↑ top                                                                 ↑ bottom

Replaced:           C D H E F   C   G     H K C

FIG. 8

SYSTEM AND METHOD FOR CACHE MANAGEMENT

CROSS REFERENCE TO RELATED APPLICATIONS

This application claims the benefit of United State Provisional Patent Application Ser. No. 60/750,781, filed Dec. 16, 2005, the entire contents of which is hereby incorporated by reference.

TECHNICAL FIELD

The described embodiments of the invention relate to Central Processing Unit (CPU) cache replacement processes and architectures. The described embodiments can also be used in other caches, such as database buffer caches and web caches.

BACKGROUND

CPU speed is much faster than the speed of the main memory. CPU caches are used to bridge the speed gap so that the CPU is not slowed down as much when performing a memory access. CPU caches are small but are faster than the main memory. Recently used instructions and data are stored in the CPU cache. When the CPU references an address, it first checks whether the address is in the CPU cache. If so, it is called a cache hit, otherwise it is called a cache miss. The proportion of memory references which result in cache hits is called the cache hit rate. Cache hit rates are very important to the user's available computing power. Higher CPU cache hit rates result in higher processing efficiency.

Larger caches have higher hit rates, but CPU circuit technology limits the size of caches. Better cache replacement algorithms also have the potential to increase hit rates. Currently, the Least Recently Used (LRU) cache replacement method is used in CPU caches. LRU is believed to be able to exploit the temporal locality of programs which means that recently referenced addresses are more likely to be referenced again in the near future. Based on this theory, LRU tries to keep addresses which have just been referenced in the cache as long as possible. For programs with good locality, where the same addresses are referenced multiple times, replacement decisions made by LRU are acceptable. For programs with poor locality, such as network protocols and applications, where a significant portion of addresses are not reused, LRU's performance is less acceptable.

It is desired to address or ameliorate one or more of the shortcomings or disadvantages of prior cache management techniques, or to at least provide a useful alternative thereto.

SUMMARY

Aspects of the invention relate generally to cache management methods and systems and computer readable storage media storing computer program instructions for cache management of a cache in a computer system. The cache has a plurality of cache lines organized in sets and each cache line has a plurality of data words. Each cache line is assigned an initial weight upon entry into the cache and the weight of each line varies according to how often its data words are accessed by the central processing unit. The weight of each cache line cannot exceed an upper weight limit, which may be the same for all cache lines, or may be different for lines having different address types.

If a data word of a cache line is hit during a cache lookup operation, the weight of that cache line is increased according to an increment function, while the weights of the other cache lines in the set to which the cache line belongs are all subject to a decrement function. If the cache lookup operation within a set of cache lines results in a miss, all cache lines in the set have their weights decremented according to the decrement function. When a cache line is to be replaced, a cache line having the lowest weight is chosen for replacement by the new cache line.

According to the embodiments described herein, the weight increase of a cache line upon a cache hit within that line and the weight decrease for a cache miss can vary according to the increment and decrement functions. Examples of such increment and decrement functions are described in the following detailed description. While the described embodiments of the invention generally relate to set-associative caches, the invention is also applicable to non-set-associative caches.

In one aspect, the invention relates to a method of cache management, comprising: assigning a weight to each cache line of a set of cache lines; adjusting the weights of each of the cache lines of the set in response to a cache hit or a cache miss in the set; and replacing the cache line in the set having the lowest weight when one of the cache lines is to be replaced in the set.

In another aspect, the invention relates to a method of cache management of a cache in a computer system, the cache having a plurality of cache lines, each cache line having one or more data words. The method comprises: assigning an initial weight to each cache line when the respective cache line is entered in the cache; establishing an upper weight limit for all cache lines; performing a cache lookup operation to determine whether a selected one of the data words is stored within a selected portion of the cache; incrementing a weight of the cache line having the selected data word according to an increment function when the cache lookup operation determines that the selected data word is stored within the selected portion of the cache; and decrementing the weights of the cache lines in the selected portion of the cache according to a decrement function when the cache lookup operation determines that the selected data word is not stored within the selected portion of the cache.

Further embodiments of the invention relate to a cache comprising: first circuitry for assigning a weight to each cache line of a set of cache lines; second circuitry for adjusting the weight of each of the cache lines of the set in response to a cache hit or a cache miss in the set; and third circuitry for replacing the cache line in the set having the lowest weight when one of the cache lines is to be replaced in the set.

Still further embodiments of the invention relate to computer readable storage storing computer readable program instructions, which, when executed by a processor, cause the processor to perform the method of: assigning a weight to each cache line of a set of cache lines; adjusting the weight of each of the cache lines of the set in response to a cache hit or a cache miss in the set; and replacing the cache line in the set having the lowest weight when one of the cache lines is to be replaced in the set.

Other embodiments of the invention relate to a method of managing a cache in a computer system, the cache having a plurality of cache lines, each cache line having one or more data words, an initial bit and a hit bit. The method comprises: setting the initial bit of each cache line when the respective cache line is entered in the cache; performing a cache lookup operation to determine whether a selected data word is stored in a cache line within a selected portion of the cache; setting the hit bit of the cache line having the selected data word when the cache lookup operation determines that the selected data word is stored within the selected portion of the cache and, if the hit bit of each cache line in the selected portion of the cache is set, clearing the hit bit of each cache line in the selected portion of the cache except the cache line having the selected data word; and replacing a selected cache line in the selected portion of the cache when the cache lookup operation determines that the selected data word is not stored within the selected portion of the cache, and if the initial bit of each cache line in the selected portion of the cache is set, clearing the initial bit of each cache line in the selected portion of the cache except the selected cache line.

BRIEF DESCRIPTION OF THE DRAWINGS

Features and functions of embodiments of the invention are described in further detail below by way of example only, with reference to the accompanying drawings, in which:

FIG. 2 is a block diagram showing the storage arrangement of a WLRU cache set;

FIG. 8 is a diagram comparing the different replacement choices of a WLRU replacement and the LRU replacement;

DETAILED DESCRIPTION OF EMBODIMENTS

Figure 1:
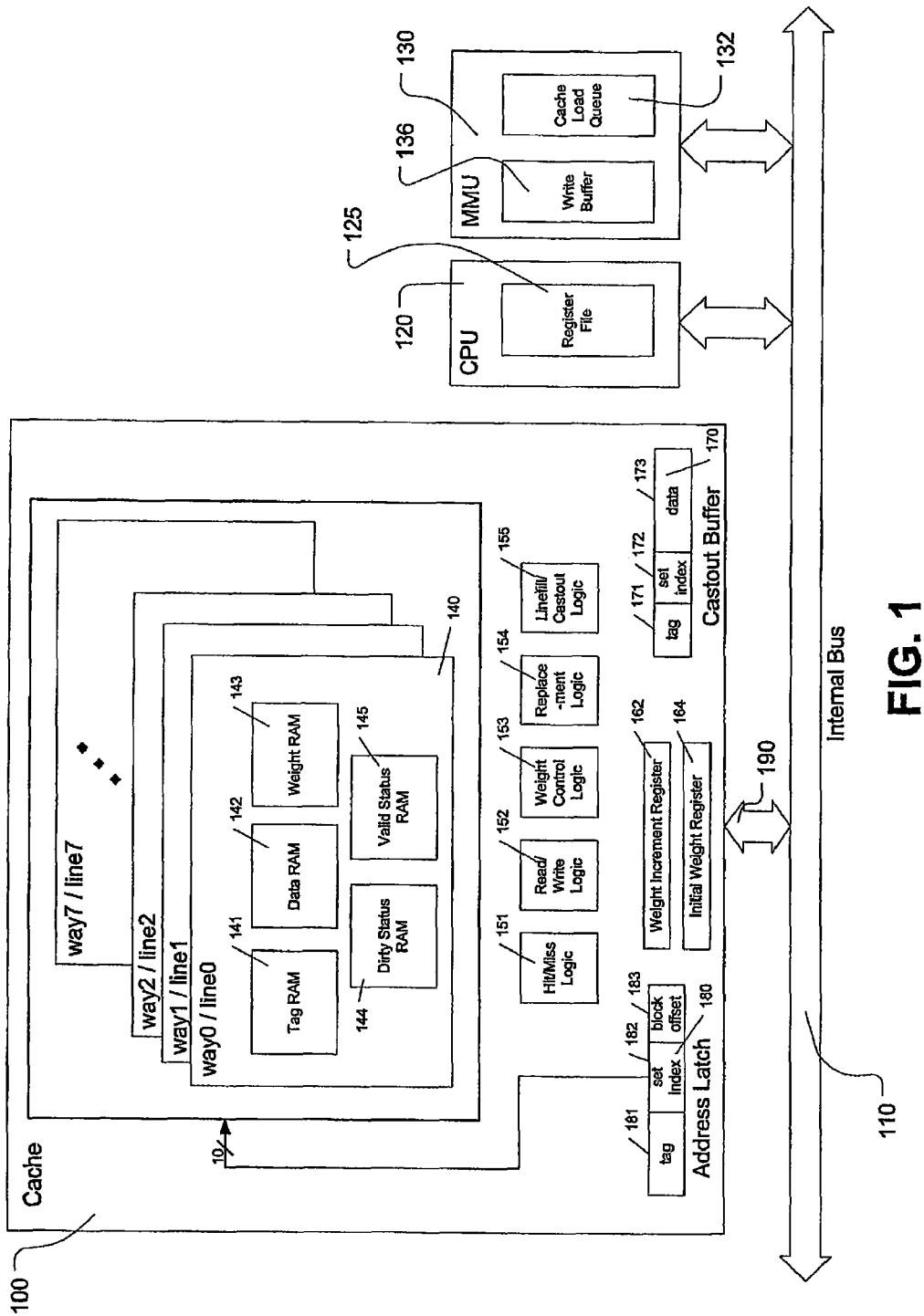
FIG. 1 is an architecture diagram of a set associative CPU cache using WLRU replacement.

When dealing with programs of poor locality, such as network protocols and applications, the LRU cache replacement method is of inferior performance. The LRU replacement method always keeps the most recently referenced address in the cache as long as possible. Weighted LRU or WLRU is a modification of the LRU replacement method which assigns a weight to each cache line and discriminates against cache lines with lower weights. The weight of a cache line is meant to correspond approximately to the likelihood that it will be referenced again. Simulations show that WLRU has significant improvement over LRU for network protocols and applications.

In WLRU, each cache line is assigned a weight. A weight is a number representing the replacement priority of the cache line. Replacement decisions are made by comparing the weights of each cache line and replacing the cache line with the minimum weight.

Weights in WLRU have upper limits. When a cache line is hit in the cache, its weight increases. The weight of a cache line decreases as time goes by if it is not hit. The amount by which a weight is incremented when a cache line is hit is a configurable parameter which may change according to workloads. The speed and the amount by which a weight is decremented when the cache line is not hit are also configurable parameters. Another important parameter in WLRU is the initial weight. An initial weight is assigned to each cache line when the cache line is first brought into the cache. In some scenarios, initial weights may be zero.

WLRU can be configured to suit programs with a wide range of locality by assigning different settings to the weight increasing and weight decreasing processes, the upper weight limit and the initial weight. Some WLRU configurations are equivalent. For example, a large increment of weights is equivalent to smaller increments if the smaller weight increments are decremented more slowly.

For simplicity of implementation, weights can be decremented for every reference to a cache (or a cache set if using a set associative cache), and weights can be increased in a linear fashion. Weights may alternatively be increased and decreased randomly according to a probability function. More complex weight increasing and decreasing mechanisms, such as non-linear ones, may have benefits for some applications, but they do not come without costs.

When weights are decremented by one each time a cache line is not referenced and increased linearly, weight formulas in the form of "i64r128b2" are used to represent the setting of the parameters of WLRU. The "i" in "i64r128b2" stands for increment of weights, and, in this example, the weight is increased by 64 if the cache line is hit. The "r" represents the upper limit, and, in the above example, the upper limit is set at 128. The "b" in weight formula stands for the initial weight, and the initial weight is set at 2 in "i64r128b2". In other words, using weight formula "i64r128b2", when an address is first loaded into the cache, its weight is 2. Every time a cache line is hit, its weight increases by 64 until it reaches 128. Each time another cache line is hit, the weights of the cache lines which are not hit are decremented by one until it reaches zero.

WLRU can be configured to behave as LFU (Least Frequently Used), FIFO (First In First Out), and LRU. For instance, when the upper limit of weights is very large, the initial weight and the increment of weights are one, and weights never decrease, the WLRU becomes LFU. When the initial weight is equal to the upper limit of weights, the weights are large and the weight increment is zero or very small, the WLRU is a FIFO replacement. When the upper limit, the initial weight, and the increment of weights are all the same and they are big enough, WLRU behaves exactly as a real LRU replacement algorithm. Table 1 is a comparison of the total cache misses of WLRU replacement algorithms with various weight formulas and a LRU replacement algorithm.

Weight formulas "i512r512b512" and "i256r256b256" have exactly the same number of cache misses as a real LRU replacement algorithm.

should always be much smaller than the upper limit of weights. The exact settings of the parameters of WLRU also depend on the size and the associativity of a CPU cache.

TABLE 1

Comparison of total cache misses of LRU and weight formulas mimicking LRU.

|  | i512r512b512 | i256r256b256 | i128r128b128 | i64r64b64 | i32r32b32 | i16r16b16 |
|---|---|---|---|---|---|---|
| LRU real 128K | 211743 | 211743 | 211743 | 211743 | 211743 | 211743 |
| WLRU 128KB | 211743 | 211743 | 211742 | 211748 | 211728 | 203653 |
| LRU real 256KB | 120817 | 120817 | 120817 | 120817 | 120817 | 120817 |
| WLRU 256KB | 120817 | 120820 | 120800 | 120613 | 117482 | 110028 |

In most cases, the initial weight, the weight increment and the upper limit should be set to different values. For programs with poor locality, such as network protocols and applications, where a large portion of addresses will not be referenced again, the initial weight should be set to a small value, and the weight increment and upper limit of weights should be large compared with the initial weight, for example "i128r128b2". In weight formula "i128r128b2", the initial weight is very small compared with the weight increment and the upper limit of weights. Using small initial weights, cache lines which are not hit in the cache are replaced quickly, much more quickly than in LRU. Valuable cache contents are kept longer by the large weight increment and the large upper limit of weights. As can be seen in Table 1, simulations show that the weight formula "i128r128b2" has more than 30% fewer cache misses than LRU for the same trace.

Table 2 shows a comparison of the total cache misses for different initial weights and weight increments using the same trace as Table 1. The upper limit of weights in the weight formulas in Table 2 is 128. It shows that the weight increments should not be small compared with the upper limits, Using large weight increments, the most frequently used addresses are arranged in LRU order and can adapt quickly to phase changes in the memory reference.

TABLE 2

Total cache misses for different initial weights and weight increments (LRU has 120746 cache misses).

|  | i4 | i8 | i16 | i32 | i64 | i128 |
|---|---|---|---|---|---|---|
| b0 | 93339 | 92300 | 92495 | 90013 | 83874 | 83300 |
| b1 | 93414 | 92423 | 92518 | 89978 | 83944 | 83300 |
| b2 | 93878 | 93469 | 94235 | 89936 | 82821 | 82304 |
| b4 | 97105 | 97412 | 97423 | 91529 | 83565 | 82961 |
| b8 | 102938 | 102851 | 100840 | 94015 | 85634 | 84880 |

The upper limit of weights controls how long a previously frequently used address can stay in the cache without being hit again. Due to the phase changes in programs, the upper limit should not be set too high, or some addresses may be fixed in the CPU cache. LFU does not have upper limits for reference counts, so it can not adapt to phase changes and generates poor results when used in CPU caches.

As a general rule, programs with poor locality have more addresses that will not be referenced again. For these programs, the initial weight is set low to purge addresses which are not referenced again faster. Good locality programs should have higher initial weights, but the initial weight WLRU shows greater improvements over LRU for larger and higher associative CPU caches.

The cost of implementing a WLRU circuit in the CPU is minimal, especially for the Compact WLRU (CWLRU). Standard WLRU may need to store weights as high as 256, which requires 8 bits per cache line to store the weight. CWLRU uses only two bits per cache line. In CWLRU, weights are increased only by one when hit but are not decreased every reference. A counter per cache set is used to record references to a cache set, and weights are decremented only when the counter reads some threshold. For example, the counter can be set to deduct weights every 64 references. CWLRU is equivalent to standard WLRU, except that some precision is lost in CWLRU with respect to the order of reference to cache lines. Simulations show that this does not significantly negatively affect the cache hit rate.

Referring to FIGS. 1 to 10, one embodiment of the invention is described, with reference to the WLRU replacement method and CPU architecture employed by the method.

FIG. 1 is a block diagram illustrating the architecture of a set associative CPU cache using WLRU replacement. The CPU cache 100 is an eight-way set associative cache, 256 KB in size, using 32 byte cache lines. The cache lines are organized in 1024 cache sets, and each cache set has eight cache lines, named from line 0 to line 7. The storage of the CPU cache 100 is organized into 8 ways 140, named from way 0 to way 7. A way is a collection storage for the cache lines of the same number from all cache sets. Way 0 is the collection storage of all line 0s of the 1024 cache sets, and way 1 to 7 contains respectively all line 1s to all line 7s. Every way 140 has five RAM memory arrays. They are Tag RAM memory array 141, Data RAM memory array 142, Weight RAM memory array 143, Dirty Status RAM memory array 144, Valid Status RAM memory array 145. These RAM arrays are store the Tag, Weight, Data, Dirty status and Valid Status part of cache lines. They are shown in detail in FIG. 2A.

The CPU cache 100 is connected to the CPU 120 and Memory Management Unit (MMU) 130 by the internal bus 110. Address Latch 180 contains the address of the word the CPU 120 is currently referencing or the address of the cache line to be filled into the cache. The address in the Address Latch 180 is divided into three parts. The most significant 19 bits of the address are the tag bits 181 of the address. The bits from 4 to 13 of the address are the set index bits 182, and the least significant 3 bits are the block offset bits 183. The set index bits 182 are used by the RAM memory arrays of a way 140 to select one of the 1024 cache lines.

The CPU cache 100 also has five control logic circuits. They are Hit/Miss Logic 151, Read/Write Logic 152, Weight Control Logic 153, Replacement Logic 154, and Line-fill/Cast-out Logic 155. These controls are needed to perform two kinds of cache operations: cache lookup operations and cache line-fill operations.

Cache lookup operations are initiated by the CPU 120. In cache lookup operations, the CPU 120 passes an address to the cache 100 and the CPU cache 100 checks whether there is a cache line having the same address. If such a cache line is found, it is called a cache hit and the CPU does the read or write to the cache line, and no access to the main memory is necessary. If no cache line with same address is found, it is a cache miss, and the CPU 120 has to visit the main memory, which takes longer than retrieving the data from cache.

Cache line-fill operations are initiated by the MMU 130. After the MMU 130 finishes a main memory access, it returns the data to the CPU 120 and will also send it into the cache 100. Cache line-fill operations update the cache content and may cause cache replacements and possibly cast-outs. Cast-outs happen when the replaced cache line is newer than its counterpart in the main memory. In a cast-out, the data of the replaced cache line is written back to the main memory. The Cast-out Buffer 170 is a temporary holder of the replaced cache line waiting to be written back. The content of the Cast-out Buffer 170 is passed to the MMU 130 and stored in the write buffer 136. In the MMU 130, the write buffer 136 contains data to be written to the main memory. The content of the write buffer 136 comes from two sources: missed write requests from the CPU 120, and replaced cache lines from the Cast-out Buffer 170. The Cache Load Queue 132 stores finished memory accesses waiting to be filled into the cache 100. Each entry in the Cache Load Queue 132 has two parts: the address and the data. The address is 29 bits long, and the data is 256 bits long. The MMU 130 always fetches a whole cache line from the main memory.

The cache 100 has two software configurable registers, which represent the weight formula of the WLRU replacement. They are the weight increment register 162 and the initial weight register 164. The value of weight increment register 162 stores the value of the "i" part of the weight formula, and the initial weight register 164 stores the value of the "b" part of the weight formula. These two registers are described below in relation to FIG. 5 and FIG. 6. The upper limit of weights, the "r" part of the weight formula, is implicitly implemented by the size of the weight storage. In this example, eight bits per cache line are used to store the weight, and accordingly the upper limit of weights is fixed at 255.

Figure 1A:
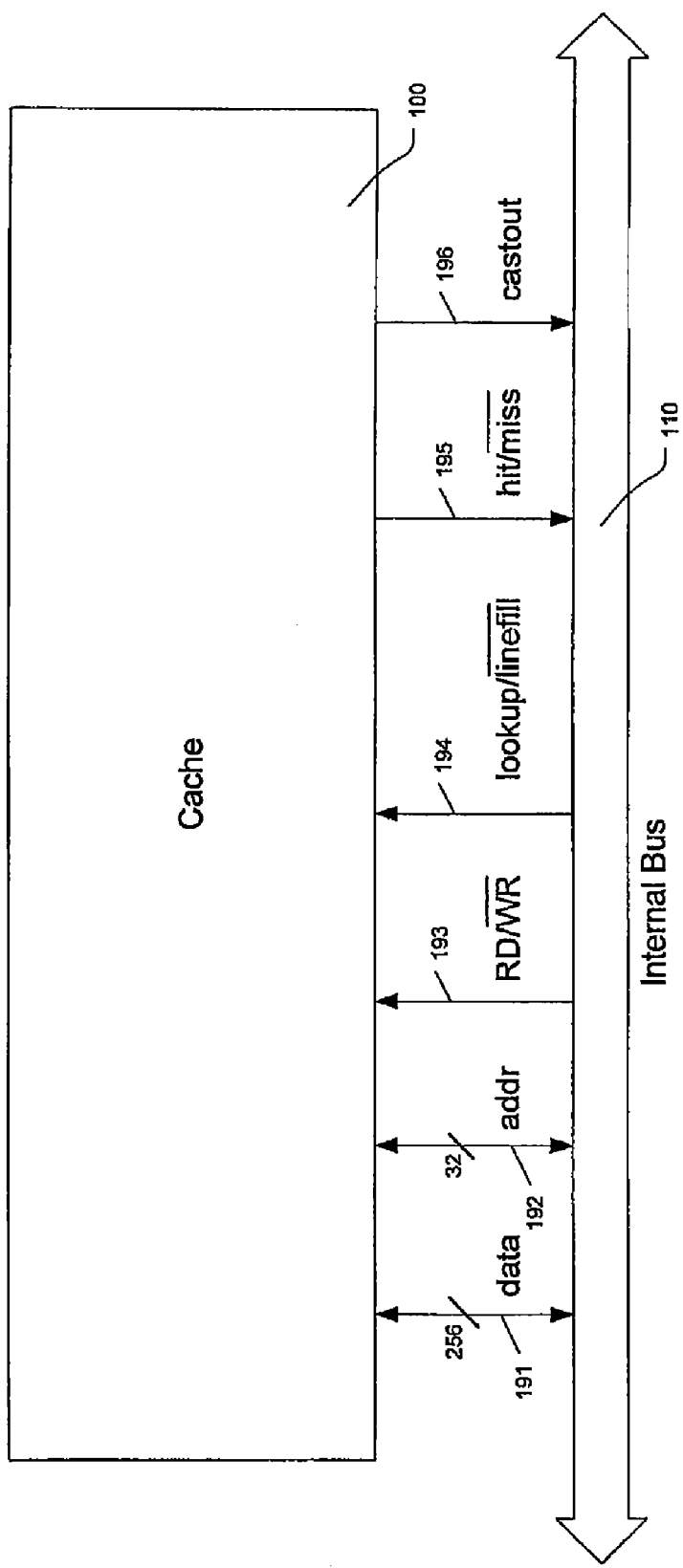
FIG. 1A is a diagram illustrating the signaling between the WLRU CPU cache and the CPU internal bus.

FIG. 1A illustrates the data and address paths and control signals related to the CPU cache 100, which include: a bidirectional 256 bit wide data path 191, a bidirectional 32 bit wide address path 192, a read/write (RD/WR) signal 193, a lookup/line fill signal 194, a hit/miss signal 195, and a cast_out signal 196. The lookup/line_fill signal 194 indicates two kinds of cache operations: cache lookup operations and cache line-fill operations. In cache lookup operations, the RD/IWR signal 193 controls whether it is a read access to the cache or a write. The signal of hit/miss 195 is used to indicate whether a cache line of matching address is found in the cache. In cache line-fill operations, signal cast_out 196 indicates whether the replaced cache line needs to be written to the main memory. In this example, the data part of a cache line is 256 bits long, so the data path 191 to the cache 100 is 256 bits wide. In cache lookup operations, only the first 32 bits of the data path 191 are used, and only one word is transferred at a time. In cache line-fill operations, the whole 256 bits are used, and each time a complete cache line data, 256 bits long, is transferred. The address path 192 is 32 bits wide. In cache line-fill operations, the lowest 3 bits of address path are not used.

When the CPU 120 needs a word from the memory, it first initiates a cache lookup operation. The address of the currently referenced word is passed to the cache 100 and stored in the Address Latch 180. The set index bits 182 of the address are used to read the tags of the eight cache lines of a cache set from RAM memory arrays. All the eight tags are compared simultaneously with the address tag in the address latch 180. If a match is found, it is a cache hit. Otherwise it is a cache miss.

The hit/miss signal is set high in case of a hit. During a cache hit, if the RD/IWR signal is high, it is a read. The data RAM memory array 142 of the hit cache line uses both the block offset bits 183 of the address and the set index 182 to locate a single word in the RAM memory array and pass it to the register file 125 of the CPU. If the RD/WR signal is low, it is a write. One word of the hit cache line is overwritten. If no matching address tag is found, the hit/miss signal is set low to indicate a cache miss, and the RD/WR signal is not used. In this case, the CPU 120 sends the memory request to the MMU 130, and the MMU 130 will access the main memory. MMU 130 fetches a whole cache line instead of the single word being referenced. The fetched cache line is stored in the Cache Load Queue 132. Later, the cache line will be filled into the cache 100.

There are five control logic circuits for every cache set. They are hit/miss logic 151, read/write logic 152, weight control logic 153, replacement logic 154, and line_fill/cast_out logic 155. The five control logic circuits perform the two kinds of cache operations and the weight calculations and adjustments associated with the operations. The hit/miss logic 151 and read/write logic 152 of the cache 100 carry out the cache lookup operations. During cache lookups, the weight control logic 153 updates the weights of each cache line according to the hit or miss status of every cache line supplied by the hit/miss logic 151. The replacement logic 154 and the line_fill/cast_out logic 155 are not used in the cache lookup operations. They are only involved in the cache line-fill operations. In a cache line-fill operation, the replacement logic 154 chooses a cache line to be replaced, and the line_fill/cast_out logic 155 finishes the cache replacement and possibly the cast-out and also sets the initial weight for the cache line containing new data.

When there are no cache lookup operations and the Cache Load Queue 132 is not empty, the MMU 130 initiates a cache line-fill operation. The lookup/line_fill signal is set low. The MMU passes the 32 bit address of the cache line, with the lower 3 bits of the address not used, and the 256 bit data to the CPU cache 100. The address is stored in the address latch 180 as in cache lookup operations. The set index part 182 of the address maps to a single cache set. The replacement logic 154 of the set chooses one of the eight cache lines to store the new cache line. Only the 256 bit data and 19 bit address tag 181 are stored.

If the chosen cache line is not empty, and the contents have been changed, which is indicated by the dirty status bit, the current content in the cache line needs to be written to the main memory. Before being overwritten, the current value of the cache line is stored in the Cast-out Buffer 170. The Cast-out Buffer 170 has three parts: the data 173, the address tag 171 and the set index 172. The Cast-out Buffer 170 is 285 bits long. When a cast-out is necessary, the cast_out signal 196 is set high, and the content of the Cast-out Buffer 170 is passed to the MMU 130. MMU 130 has a write buffer 136, which stores cast-out cache lines and missed CPU writes. Entries of the write buffer 136 will be written to the main memory when the memory bus is not busy.

FIG. 2 shows an example storage arrangement of a WLRU cache set. In this example, each WLRU cache set has 8 cache lines. Every cache line requires 285 bits of storage. Of them, one bit 220 is used for dirty status, one bit 210 is for the valid status. 19 bits 230 are used to store the address tag. 8 bits 240 are used to store the weight, and 256 bits 250 are used to store the data of a cache line. The 8 bits of weight storage 240 implies that the upper limit of weight in this example is 255.

Figure 2A:
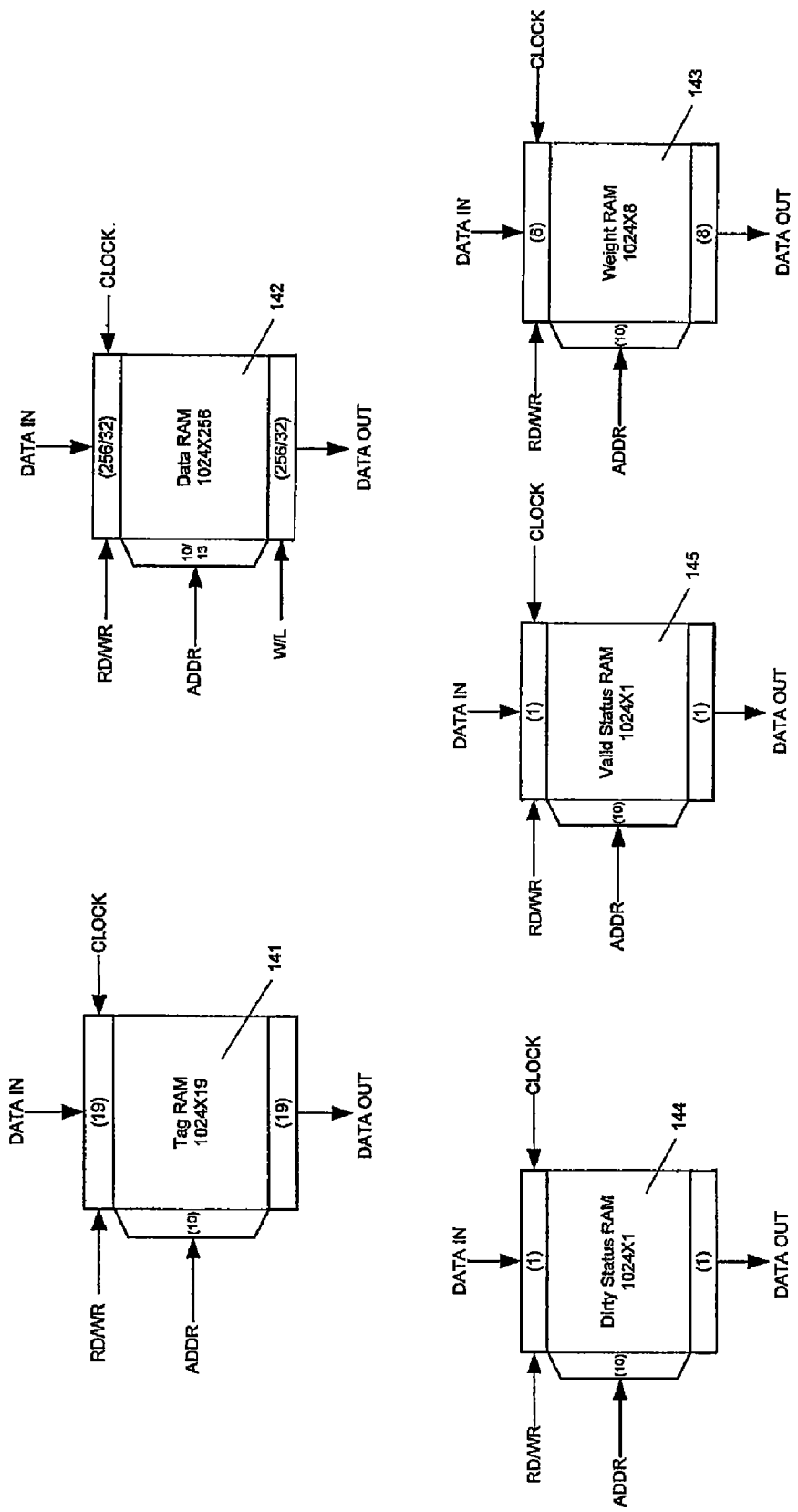
FIG. 2A is a block diagram showing the random access memory (RAM) arrays of a way of a WLRU cache.
Figure 6:
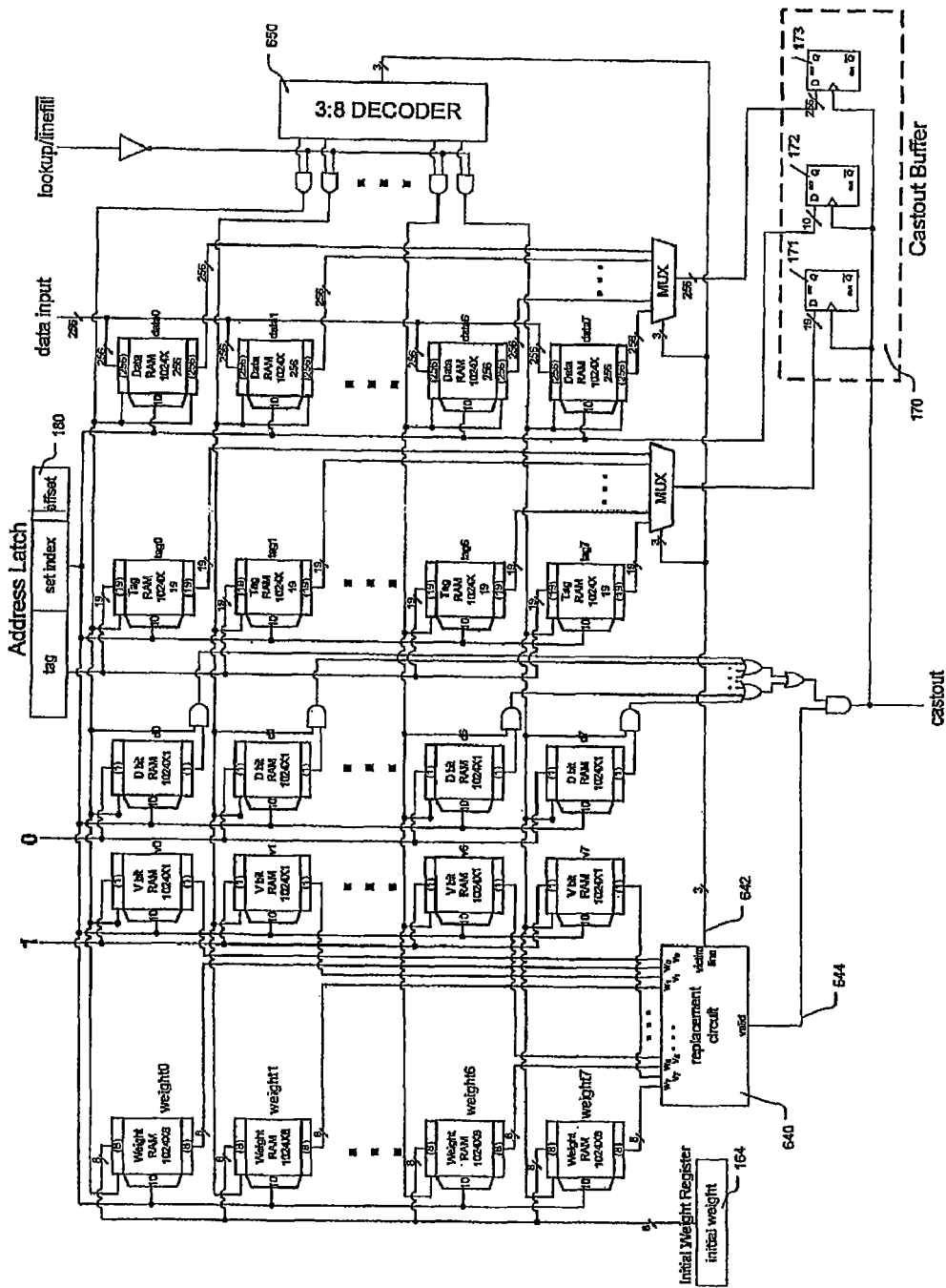
FIG. 6 is a block diagram showing the replacement and line-fill/cast-out logics of a WLRU cache.

FIG. 2A is a block diagram of the RAM memory arrays used by a way 140 of the CPU cache 100 as storage. A RAM memory array contains multiple words of storage, all of the same size. Only one word in a RAM memory array can be accessed at a time. The word to be accessed is selected by means of an address. The RD/WR signal controls the read or write operations to the RAM memory array. When the RD/WR signal is high, the word selected by the address is read out the DATA OUT bus. When the RD/WR signal is low, the word selected by the address is overwritten by the value on the DATA IN bus. Before the content of the RAM memory array is overwritten, the current content of the word is first read out in the first half of the cycle and will hold on the DATA OUT bus for the whole cycle. The actual writing happens in the second half of the cycle. This feature of the RAM memory array permits the content of a to-be-replaced cache line to be copied to the Cast-out Buffer 170 before it is overwritten, as shown in FIG. 6.

Figure 3:
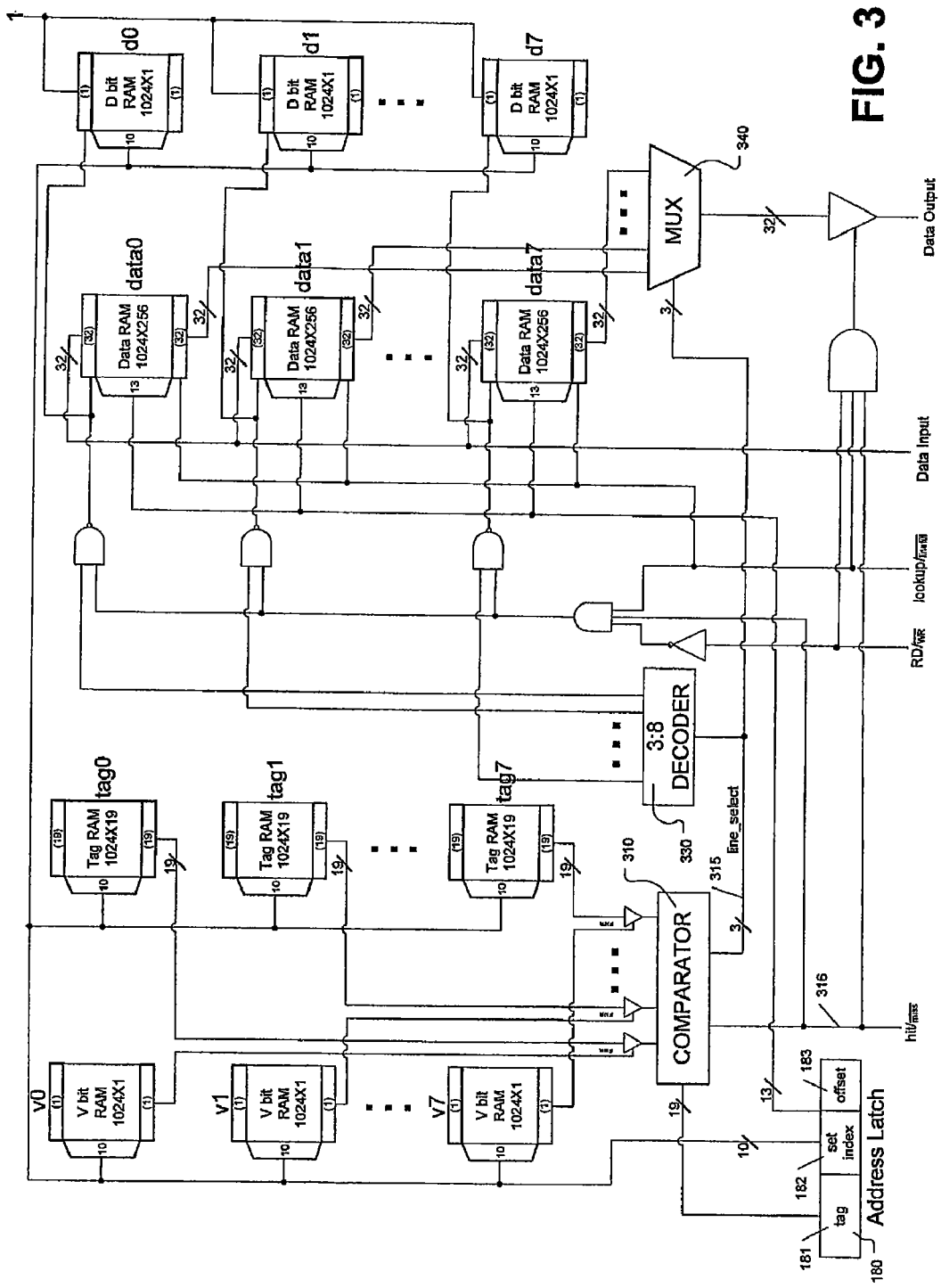
FIG. 3 is a block diagram showing the hit/miss logic and read write logics of a WLRU cache.

The CPU cache 100 is an eight-way associative cache and has eight Tag RAM 141, eight Data RAM 142, eight Weight RAM 143, eight Dirty Status RAM 144, and eight Valid Status RAM 145 memory arrays. The eight Valid Status RAM memory arrays 145 used to implement the valid status storage are named v0 to v7, and the eight Dirty Status RAM memory arrays 144 for the dirty statuses are named d0 to d7. The eight Tag RAM memory arrays 141 for address tags are named tag 0 to tag 7, and the eight Data RAM memory arrays 142 are named data 0 to data 7. These are shown in FIG. 3. The eight Weight RAM memory arrays 143 are named weight 0 to weight 7.

The words in the Tag RAM memory array 141 are 19 bits long, and there are 1024 words in the Tag RAM memory array 141. The words in the Weight RAM memory array 142 are 8 bits long, and the words in the Dirty Status RAM memory array 144 and the Valid Status RAM memory array 145 are one bit long. Since all the cache lines with the same numbering in a cache set are stored together in a way and there are 1024 cache sets, there are 1024 words in the RAM memory arrays except the Data RAM memory array 142. Except the Data RAM 142, the addresses of RAM memory arrays are all 10 bit wide, and the DATA IN and DATA OUT buses are all of the same size as the words in the RAM memory arrays.

The total number of memory cells in a Data RAM memory array 142 is 1024*256 bits. The DATA IN and DATA OUT buses of Data RAM memory array 142 are 256 bits wide, and the address bus is 13 bits wide. The Data RAM memory array 142 supports two modes of accessing, which is controlled by the W/L signal. When the W/L signal is high, the Data RAM memory array 142 operates in the word mode. In the word mode, the address to Data RAM memory array is 13 bits wide. Each time one 32 bit word is read or written, and only the lower 32 bits of the DATA IN and DATA OUT buses are used. If the W/L signal is low, the Data RAM memory array 142 is in the line mode. In line mode, all the 256 bits of the DATA IN and DATA OUT buses are used. Each time a 256 bit wide word is read or written, and only the higher 10 bits of the address to the Data RAM memory array 142 are used.

FIG. 3 is a block diagram illustrating an example circuit of the hit/miss logic and the read/write logic of a WLRU cache. The hit/miss logic and read/write logic are referred to in FIG. 1 as 151 and 152 respectively. They carry out cache lookup operations. The address of the word that the CPU 120 is currently referencing is stored in the Address Latch 180. The 10 set index bits 182 of the address is connected with all the RAM memory arrays except the Data RAM memory arrays 142 of the eight ways. The Data RAM memory arrays 142 are connected to the lower 13 bits of the Address Latch 180.

In the hit/miss logic 151, a comparator 310 simultaneously compares the stored address tags of the 8 cache lines of the selected cache set with the tag bits 181 of the address stored in the Address Latch 180 and outputs the hit/miss signal 316 and the line_select signal 315. Only valid cache lines are involved in the tag comparison. If one of the 8 tags stored is the same as that in the Address Latch 180 and the valid bit of the cache line is set, there is a cache hit and the hit/miss signal 316 is set high. The line_select signal 315 indicates the number of the cache line which generates the cache hit.

If no matching address tag is found, it is a miss. In such a case, the hit/miss signal 316 is set low, and the line_select signal 315 is not used, and there will be no reading from nor writing to the cache lines. The line_select signal 315 and the hit/miss signal 316 are needed in the weight control logic 153 to update the weights of all cache lines in the cache set, as illustrated in FIG. 4.

When a cache hit happens, if it is a cache read, the line_select signal 315 controls the output of a multiplexer 340 and one word in the hit cache line is read out. In case of a cache write, line_select signal 315 is decoded in decoder 330. The output of the decoder 330 activates only one cache line, the hit cache line, and one word of the cache line is overwritten by the value on the data input bus. When writing happens, the dirty status bit of the cache line to be written is set. Later when the line is replaced, the content of the cache line, whose dirty status bit is set, will be written to the Cast-out Buffer 170, as illustrated in FIG. 6. In cache lookup operations, only one word is read from or written to the cache line. The block offset part of the address, which is stored in the Address Latch 180, controls which one of the eight words in a cache line data is accessed.

Figure 4:
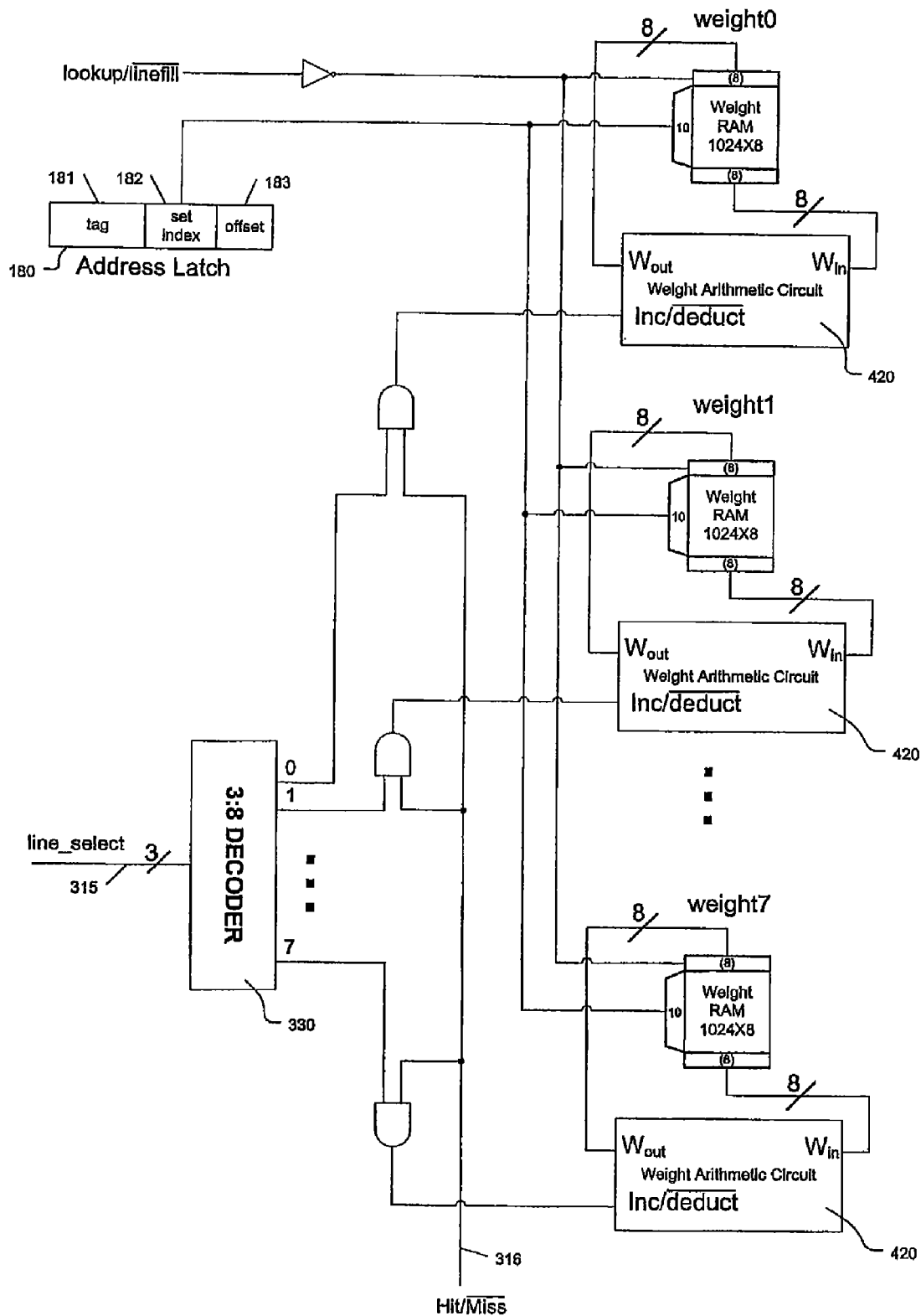
FIG. 4 is a block diagram showing the weight control logic of a WLRU cache.

FIG. 4 is a block diagram illustrating example weight control logic involved in cache lookup operations. The weight control logic is referred to in FIG. 1 as 153. In this example, weights are recalculated at every reference to the cache set, no matter the reference results in a cache hit or a miss. The set index bits 182 of the address latch 180 are connected to the Weight RAM memory arrays 143 of all eight ways. Only the weights of the selected cache set are changed. If there is a cache hit, as indicated by the hit/miss signal 316, decoder 330 decodes the line_select signal 315 and selects the hit cache line. The weight of the hit cache line is increased, but all other cache lines have their weights decremented by one. In case of cache misses, when the hit/miss signal 316 is low, the weights of all cache lines in the cache set are decremented by one. The weight arithmetic circuit 420 takes the old weight as input and outputs the new weight. Its detail is explained in FIG. 5.

Figure 5:
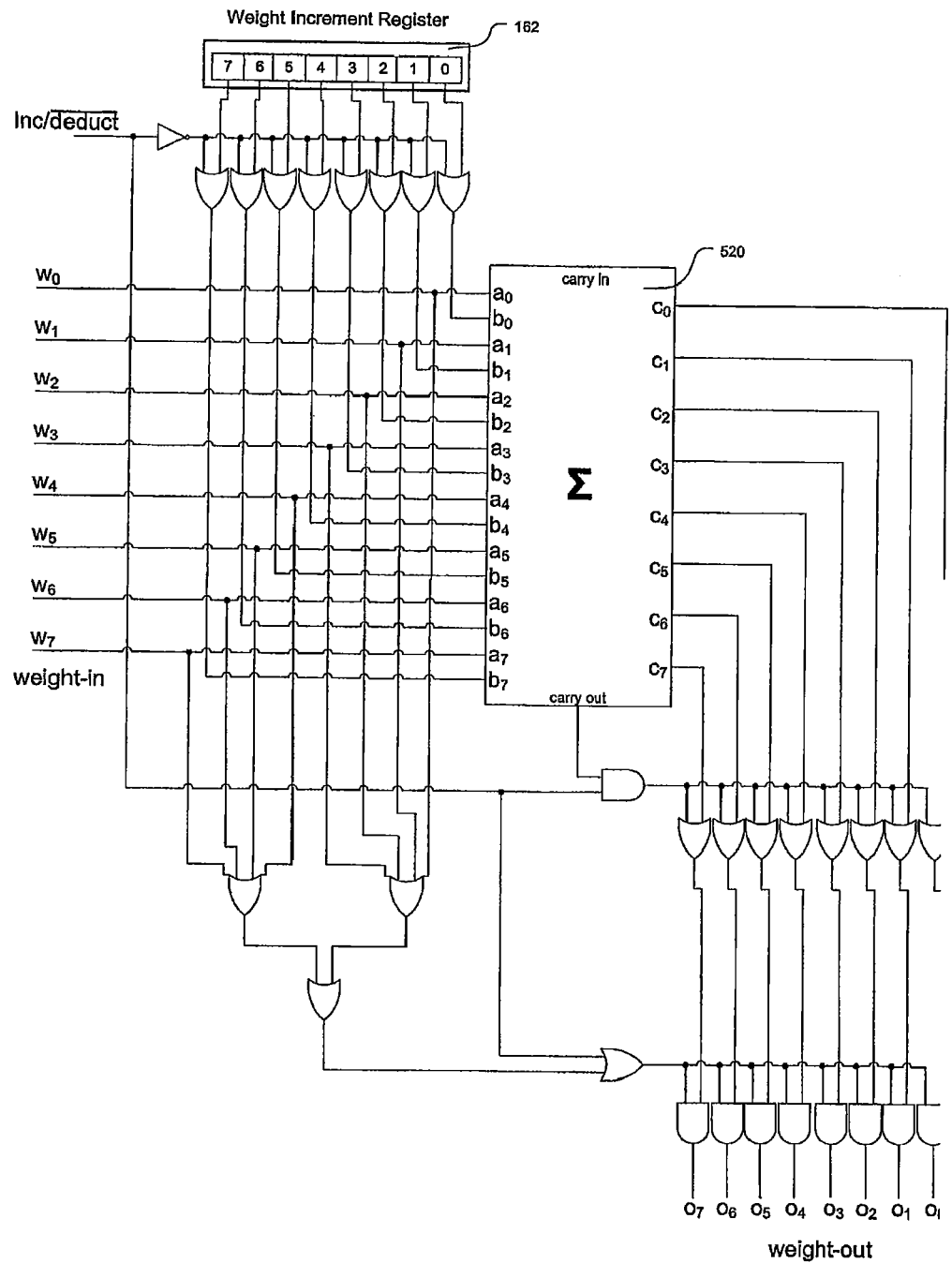
FIG. 5 is a block diagram showing the weight arithmetic circuit in the weight control logic.

FIG. 5 is a diagram showing an example weight arithmetic circuit, which is referred to as 420 in FIG. 4. The core of the circuit is an 8 bit wide full adder 520. The weight arithmetic circuit 420 can perform two operations: increasing the weight and deducting the weight by one. Input signal Inc/deduct controls the choice of the two operations. Input lines w0 to w7 are the old weight, and output lines o0 to o7 are the new weight.

If a cache line is hit, the Inc/deduct signal is set high, and its weight arithmetic circuit 420 performs an unsigned adding of the old weight and the value of the weight increment register 162. The weight increment register 162 is software configurable. The size of the register is 8 bits, which can support weight formulas whose increments are equal to or less than 255. If the sum of the old weight and the number in the weight increment register 162 overflows, which is indicated by setting of the carryout signal of the adder 520, the weight-out bits, o0 to o7, are all set to one. The new weight becomes 255, which is the upper limit of weights.

In the case of a cache miss, the Inc/deduct signal is set low. The weight arithmetic circuit 420 of a cache line performs a signed deduction of the old weight by one. The value of the weight-out is the value of the weight-in minus one. When the weight-in is already zero, deducting it by one results in an underflow. In the case of an underflow, the weight-out is set to all zero. Underflow is detected if all bits of the weight-in are zero. Weights in this example are always greater than or equal to zero and less than or equal the upper limit.

FIG. 6 is a block diagram showing example replacement 154 and line-fill/cast-out 155 logic circuits of a WLRU cache. Cache line-fill operations are initiated by the MMU 130. The Address Latch 180 contains the address of the new cache line, and the 256 bit wide data input has the data of the new cache line to be filled. All eight words of the data of the new cache line are loaded simultaneously. The replacement circuit 640 takes all eight weights and their valid statuses as inputs and outputs the number of the cache line to be replaced. The 3-bit wide victim_line signal 642 contains the number of the line to be replaced. The victim_line signal 642 is decoded at decoder 650 to enable writing to the chosen cache lines. The words in the RAM memory arrays of selected cache line are overwritten. The tag and the data will have new contents, and the valid status bit will be set and the dirty status bit will be cleared. The newly loaded cache line is assigned an initial weight from the initial weight register 164. The Initial Weight Register 164 is software configurable.

If the selected cache line to be replaced is valid and its dirty status is set, the data and the address tag of the cache line need to be written to the Cast-out Buffer 170 before they are overwritten. The Cast-out Buffer 170 consists of three parts: the tag 171, the set index 172, and the data 173. The tag 171 and the data 173 are read from the RAM memory arrays of the to-be-replaced cache line, but the set index 172 is read from the address latch 180. Although the address latch contains the address of the new cache line, the set index part 182 is the same as the set index of the address of the to-be-replaced cache line. The cast_out signal is set high if the Cast-out Buffer 170 is loaded. If the replaced cache line is not valid, nor dirty, the existing cache line is simply overwritten and there is no cast-out, in which case the cast_out signal is set low. If the cast_out signal is high, MMU 130 reads the content of the Cast-out Buffer 170 to its write buffer 136 and will write it to the main memory when the memory bus is not busy.

Figure 7:
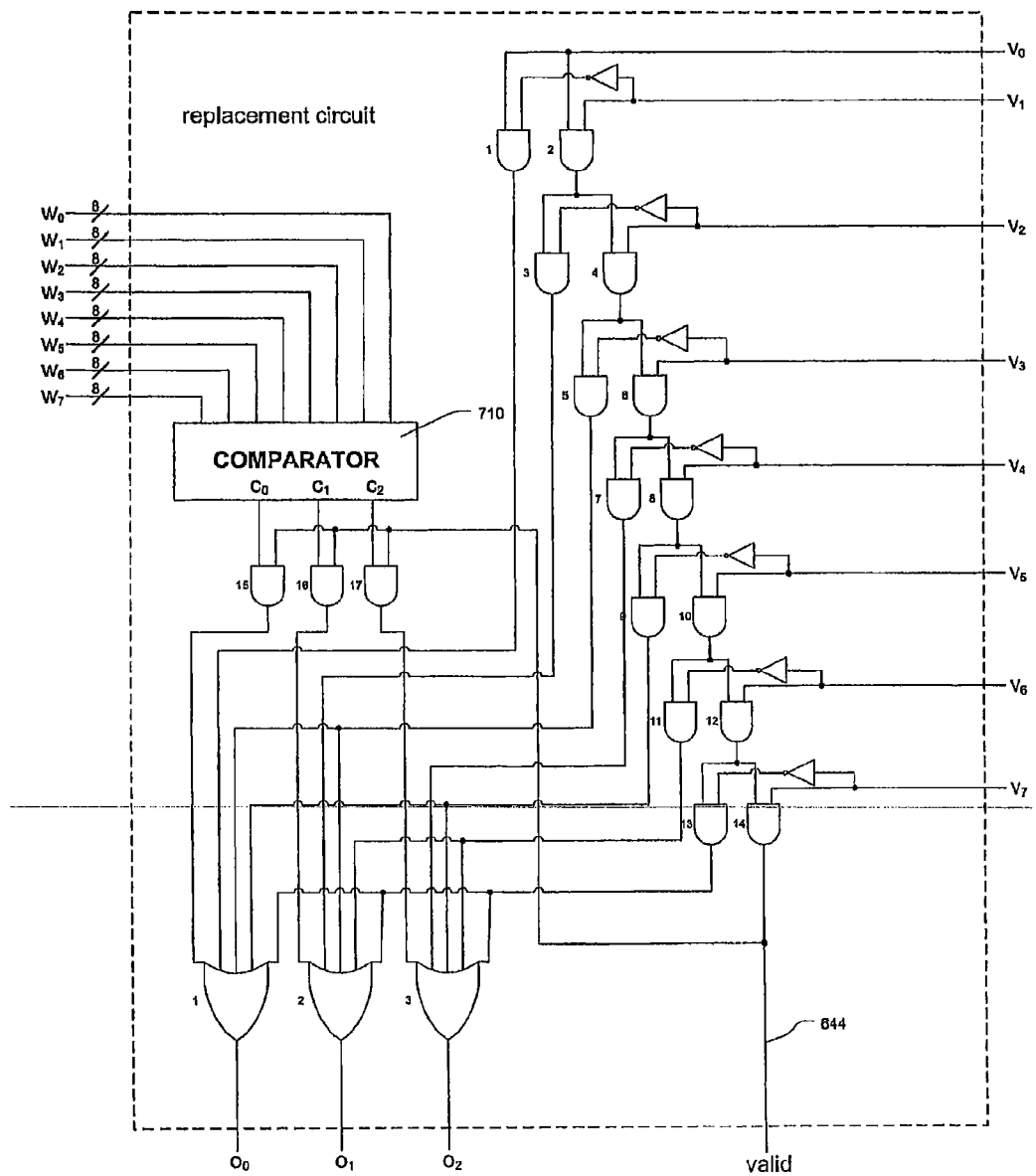
FIG. 7 is a block diagram showing the replacement logic of a WLRU cache.

FIG. 7 is a diagram showing an example of the replacement circuit referred to as 640 in FIG. 6. Input signal w0 to w7, each 8 bits wide, are the weights of cache line 0 to cache line 7. Input signal v0 to v7 are the valid status bits of cache line 0 to cache line 7. Output signals o0, o1, o2 encodes the number of the cache line to be replaced, and the valid signal 644 indicates whether the to-be-replaced cache line is valid or not. The core of the replacement circuit 640 is a comparator 710. The comparator 710 takes the weights of all cache lines in the cache set as inputs and outputs the number of the cache line with the minimum weight. If there is more than one cache line with the minimum weight, the cache line with the smallest number is chosen.

If there are invalid cache lines, the replacement circuit 640 chooses an invalid cache line and ignores the output of the comparator 710. Invalid cache lines can be empty cache lines or cache lines being invalidated explicitly. In both cases, invalid cache lines are replaced first. If there is more than one invalid cache line, the cache line with the smallest number is chosen. If all cache lines are valid, the output of the comparator is used as the final replacement decision, and the valid signal 644 is set high. The valid signal 644 is used in FIG. 6 to decide whether to load the Cast-out Buffer 170. If the to-be-replaced cache line is an invalid one, the valid signal 644 is set low. In this case, there is no need to copy the content of to be replaced cache line to the Cast-out Buffer 170.

FIG. 8 is a diagram showing the different replacement choices of the LRU replacement method and a WLRU replacement method for the same sequence of references. In FIG. 8, the cache has four cache lines and is full associative. LRU keeps the cache lines in order of their last references with the most recently referenced one on the top and the least recently referenced one at the bottom. On cache misses, LRU replaces the line at the bottom. WLRU assigns every cache line a weight. Cache lines are ordered by their weight. Lines with larger weights are on the top of lines with smaller weights. When replacing, the line with the smallest weight is chosen. If there is more than one cache line with the minimal weight, for simplicity of implementation, the line with the lower line number is replaced.

The weights in the WLRU method keep changing, whether cache lines are hit or not. Weights increase when cache lines are hit, but weights do not increase more than the upper limit. When an address is first brought into the cache, it is assigned an initial weight. Weights decrease if cache lines are not hit. For simplicity, the weight of a cache line is decremented by one for every reference in which the cache line is not hit. Other predetermined weight decrement values may be used, if desired, and the full adder circuit of FIG. 5 may be configured for this purpose. A weight formula of the form "i64r128b2" is used to summarize the control of weights. The "i64" part stands for weight increasing: the weight is increased by 64 every hit. The "r128" part is the upper limit: the upper limit of weights is 128, and weights never increase beyond that value. The "b2" is the initial weight: a new line is assigned an initial weight of 2 in this example.

The weight formula used by the WLRU replacement in FIG. 8 is "i6r8b1", which stands for an initial weight of one, an upper limit of weights of 8, and a weight increment, when hit, of 6. In this example, each cache line, when loaded for the first time, is assigned an initial weight of 1. When hit, the weight is increased by 6, up to the maximum of 8. If not hit, at every reference, the weight is decremented by one until zero.

Using address A as example, address A is first loaded into the cache at step 0 and is hit at steps 3, 9, 14, and 17. At step 0, address A is assigned an initial weight of 1. At step 1, its weight is decremented to 0, and remains 0 for step 1 and 2. When hit at step 3, its weight is increased to 6. From step 4 to step 8, the weight of address A is decremented by one every step and becomes 1 at step 8. At step 9, address A is hit again, and its weight is increased by 6 to 7. From step 10 to step 13, its weight is decremented by one each step to 3. At step 14, address A is hit and its weight is increased to 8, the upper limit of weights. At step 17, address A is hit for another time, and its weight increases again.

The reference sequence in FIG. 8 represents a typical poor locality program such as network protocols and applications. Most of the addresses in the reference sequence are referenced only once, and a small portion of the addresses, address A and B, are very frequently referenced. WLRU is better than LRU in keeping frequently used addresses in cache and thus has fewer cache misses.

Figure 9:
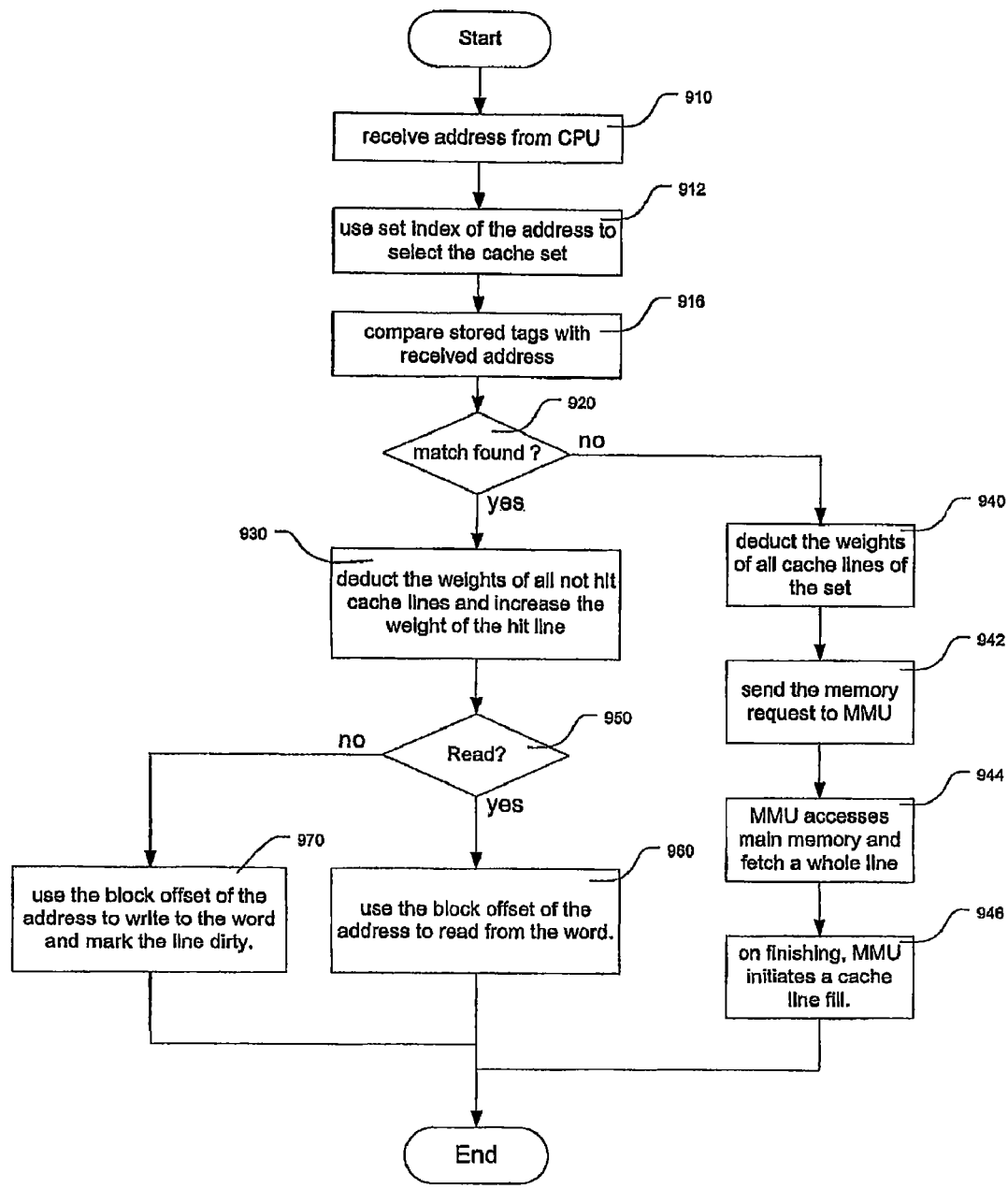
FIG. 9 is a flow chart showing the steps of a cache lookup operation of a WLRU cache.

FIG. 9 is a flow chart showing the steps of cache lookup operations of WLRU caches. Cache lookup operations are initiated by the CPU 120. Cache lookup operations begin at step 910, at which the address of the word the CPU 120 is currently visiting is loaded into the Address Latch 180. At step 192, the set index part 182 of the address in the Address Latch 180 is used as an address to the RAM memory arrays to operate on the selected cache set only. In step 196, the tag part 181 of the address in the Address Latch 180 is compared with the tags of the 8 cache lines of the cache set at comparator 310. Comparator 310 outputs the Hit/Miss signal 316.

At step 920 the Hit/Miss signal is used to test whether a match is found. If one of the valid cache lines has the same address tag as that in the Address Latch 180, it is a match or a cache hit. Otherwise, there is no matching address tag, and it is a cache miss. In case of cache hit, step 930 is taken, at which the weights of all cache lines are changed. In step 930, decoder 330 causes only the hit cache line to have its weight increased and all other cache lines to have their weight decremented by one. The amount of the increment of the weight for the hit cache line is controlled by the Weight Increment Register 162. At the end of the cycle, the weights of all cache lines are re-calculated.

At step 950, if the RD/WR signal is high, it is a cache read and step 960 is followed. In step 960, one word of the eight words of the cache line data is read out. The word is selected using the lowest 3 bits, the block offset bits 183, of the Address Latch 180. If the RD/IWR signal is low, which means a cache write, step 970 is followed. In step 970, the block offset bits 183 of the Address Latch 180 are used to locate one of the eight words of the hit cache line, the word is overwritten, and the dirty status bit of the hit cache line is set.

In case of a cache miss, step 940 is followed. In step 940, the Hit/Miss signal 316 is low, and it causes the weight arithmetic circuit 420 of all cache lines to deduct the weights by one. In step 942, the Hit/Miss signal 316 causes the CPU 120 send the memory reference request to the MMU 130. In step 944, the MMU 130 visits the main memory and fetches the whole cache line, 256 bits in size, containing the desired word. On finishing, the fetched cache line is stored in the Cache Load Queue 132 of the MMU 130. When the internal bus 110 is free, the MMU 130 initiates a cache line-fill operation, at step 946.

Figure 10:
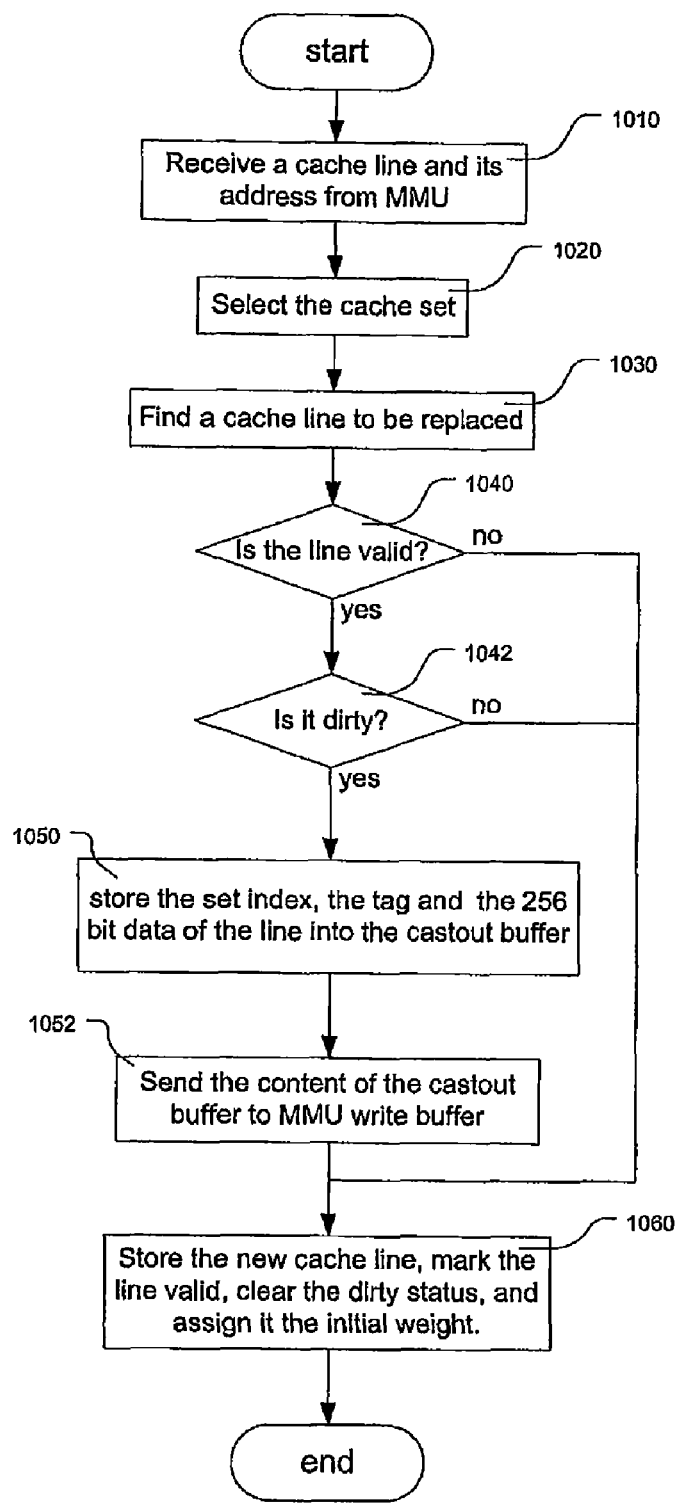
FIG. 10 is a flow chart showing the steps of a cache line-fill operation of a WLRU cache.

FIG. 10 is a flow chart illustrating the steps of cache line-fill operations of WLRU caches. Cache line-fill operations are initiated by the MMU 130. The Cache Load Queue 132 stores the address and the data of the new cache line to be filled into the CPU cache 100. A cache line-fill begins at step 1010, at which the address of the to-be-filled cache line is stored in the Address Latch 180, and the data of the cache line is put on the 256 bit wide data path of internal bus 110. At step 1020, the set index part 182 of the address in the Address Latch is used to address the RAM memory arrays to select a single cache set. At step 1030, the replacement circuit 640 compares all the weights of the cache lines of the cache set and outputs the number of the cache line to be replaced. If the to-be-replaced cache line is not valid or is not dirty, the method goes directly to step 1060, at which the to- be-replaced cache line is overwritten without saving its content. At step 1060, the whole 256 bit data input is stored in Data RAM memory array 142 of the to-be-replaced cache line, and the tag part 181 of the Address Latch 180 is stored in Tag RAM memory array 141 of the same cache line. The dirty status bit of the cache line is cleared, and the valid status bit of the cache line is set. An initial weight is assigned to the replaced cache line. The initial weight of a new cache line is copied from the Initial Weight Register 164.

If, at step 1040 and step 1042, the to-be-replaced cache line is both valid and dirty, at step 1050, the content of the cache line is stored into the Cast-out Buffer 170. The address tag and the data of the to-be-replaced cache line are read from the RAM memory arrays, but the set index part 172 of the Cast-out Buffer 170 is taken from the Address Latch 180. At step 1052, the cast_out signal is set high, and the content of the Cast-out Buffer 170 is passed to the MMU 130. At step 1060, the cache line is loaded with a new address tag and new data, and its initial weight and the status bits are also set.

Figure 11:
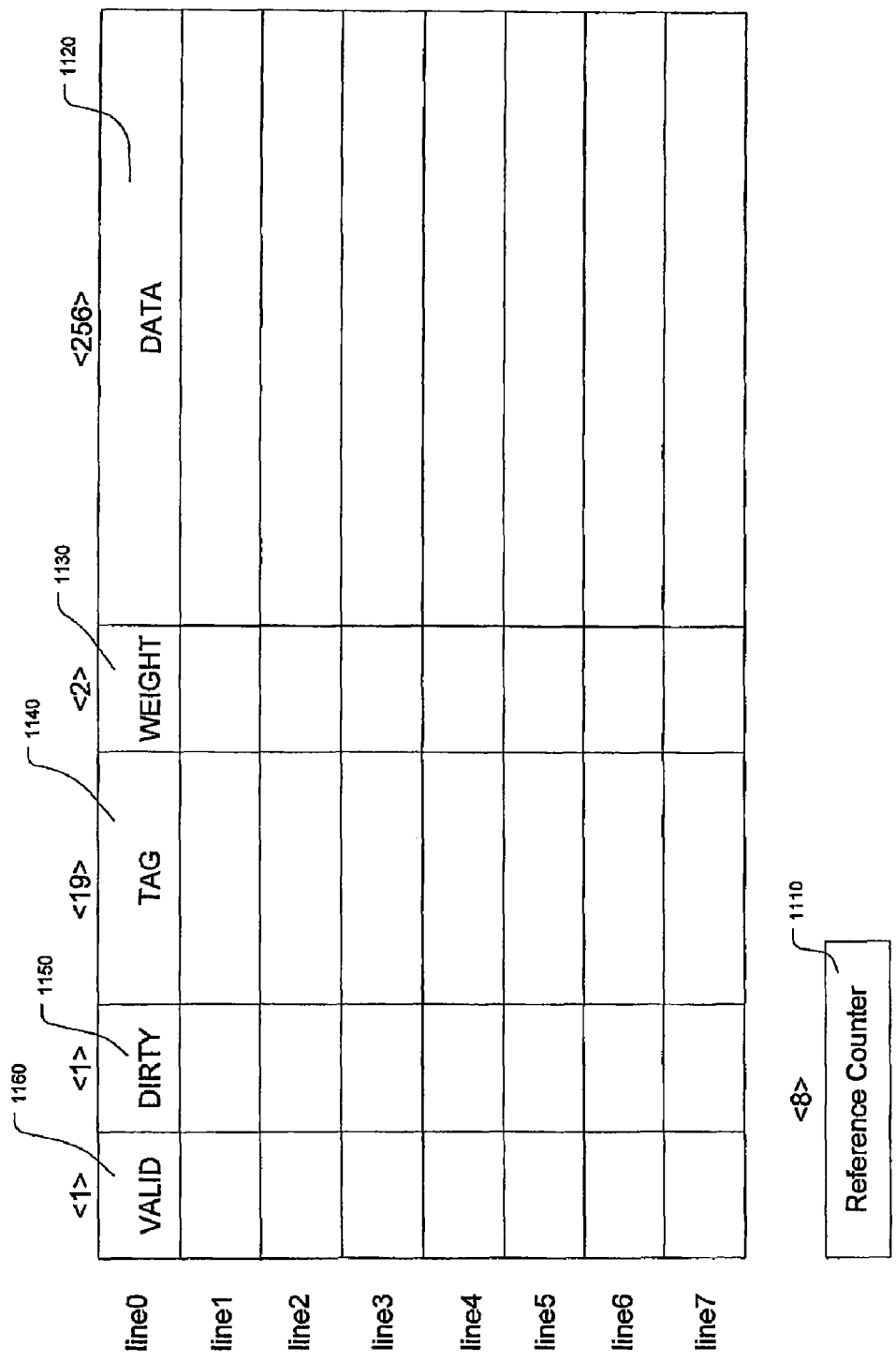
FIG. 11 is a block diagram showing the storage arrangement of a CWLRU cache set.

Referring now to FIGS. 11 to 16, a further embodiment of the invention is shown and described. FIG. 11 is a block diagram showing the storage arrangement of a cache set using a Compact WLRU (CWLRU) replacement method. Every cache line requires 279 bits of storage. Of them, one bit 1150 is used for dirty status, one bit 1160 is for the valid status. Nineteen bits 1140 are used to store the address tag. Two bits 1130 are used to store the weight, and 256 bits 1120 are used to store the data of a cache line. CWLRU caches are substantially the same as WLRU caches, except for the weight control logic 153. The replacement logic 154 and the line_fill/cast_out logic 155 of CWLRU caches are only slightly different from those of WLRU caches.

As illustrated in FIG. 2, the WLRU implementation requires 8 bits per cache line to store the weight, and the upper limits of weights is set implicitly at 255. The CWLRU implementation in FIG. 11 uses only two bits per cache line, and the upper limit of weights is thus 3. Since the weight determines the cache stay time of a line, the small upper limit of weights in CWLRU may not be able to let a line stay in the cache long enough if weights are still decremented at every reference. One solution is to deduct weights less frequently. In CWLRU, weights are decremented after a predetermined number of references. In the CWLRU embodiment, each cache set has an 8-bit reference counter 1110 used to record the number of references to the cache set. The weights of cache lines are decremented by one when the reference counter 1110 reaches the pre-determined number (threshold). If the threshold is defined, for example, at 64 references, weights are decremented every time the reference counter 1110 reaches 64, and it requires approximately 64*3=192 references to deduct a weight of 3 to zero. The threshold of reference counts is stored in a global register called the RefCount Register 1240. RefCount Register 1240 is software configurable. Compared with WLRU, which has 3 parameters, CWLRU has only one configurable parameter, the frequency of deduction, which is controlled by the RefCount Register 1240.

In another embodiment, more than one threshold reference count can be used. For example, two thresholds can be used, one set at 64 and the other set at 128. This would necessitate a second RefCount Register (not shown) to store the second threshold. Using multiple thresholds, CWLRU weights are decremented at different frequencies for different values. For example, a CWLRU weight which reads 2 or 3 is decremented every 128 references, but a CWLRU weight which reads 1 is decremented every 64 references. Thus, cache lines with more hit histories are favored more. For simplicity of description only one threshold and only one RefCount Register 1240 will be assumed.

A drawback of using a counter per cache set is that some accuracy in the order of references to cache lines may be lost. For example, one cache line may be hit before another line, but the two lines may have their weight decremented at the same time. Simulations show that such a loss in accuracy of CWLRU does not harm hit rates appreciably.

Figure 11A:
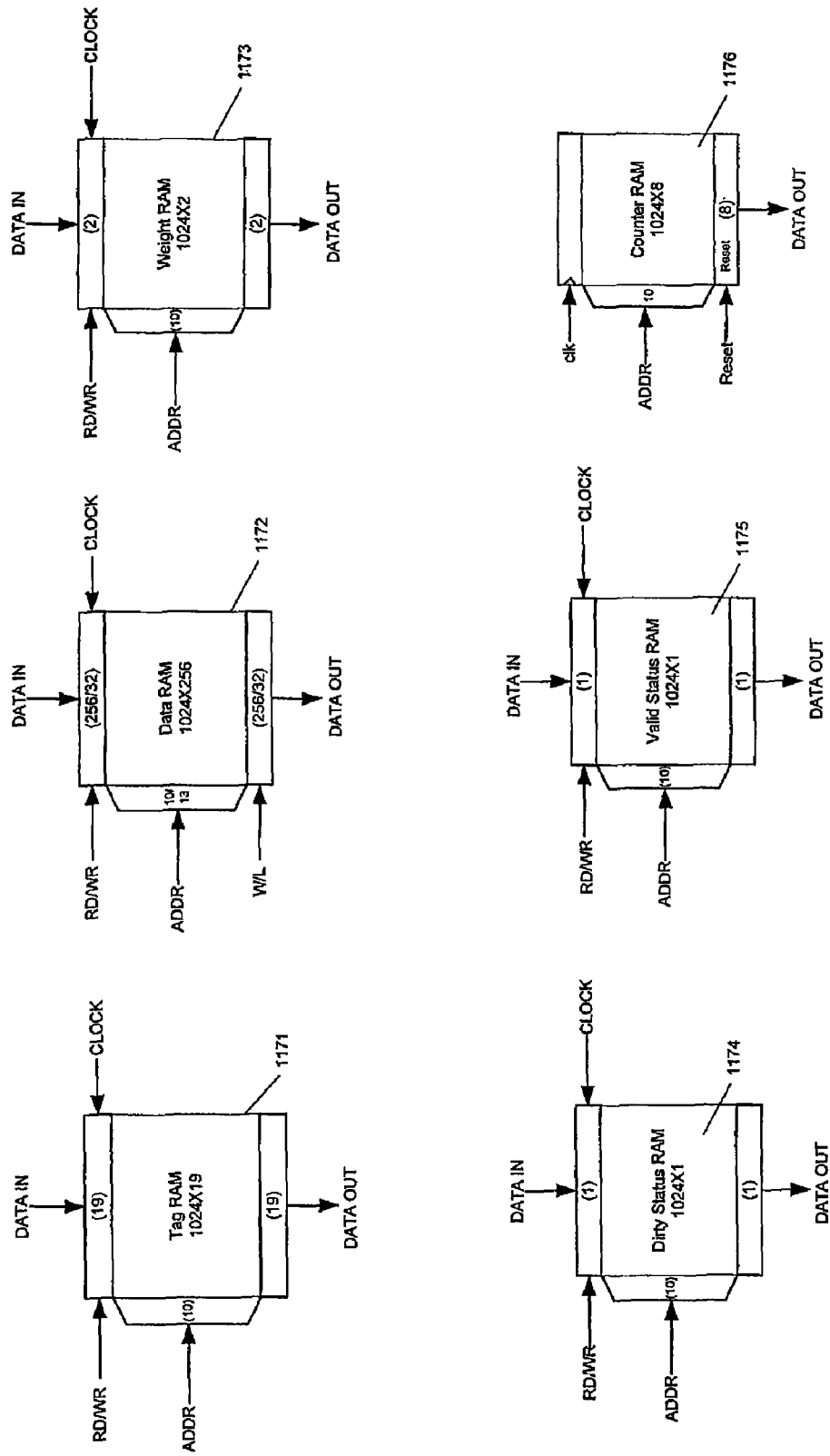
FIG. 11A is a block diagram showing the RAM memory arrays of a CWLRU cache.

FIG. 11A is a block diagram illustrating the RAM memory arrays used by a CWLRU cache. The CWLRU cache in this example is a eight-way set associative cache, with 1024 cache sets. Like a WLRU cache, a CWLRU cache has eight Tag RAM 1171, eight Data RAM 1172, eight Weight RAM 1173, eight Dirty Status RAM 1174, and eight Valid Status RAM 1175 memory arrays. The TAG RAM memory arrays 1171 are named tag0 to tag7, the Data RAM memory arrays 1172 are named data0 to data7, the Weight RAM memory arrays 1173 are named wieghto to weight7, the Dirty Status RAM memory arrays 1174 are named d0 to d7, and the Valid Status RAM memory arrays 1175 are named v0 to v7. The RAM memory arrays in the CWLRU cache have the same configurations and control signals as those in FIG. 2A, apart from Weight RAM memory arrays 1173. In CWLRU caches, the words in the Weight RAM memory arrays 1173 are 2 bits wide.

Another difference between the CWLRU cache and the WLRU cache is that, in the CWLRU cache, there is a Counter RAM memory array 1176. There is only one Counter RAM memory array 1176 in the CWLRU cache. The Counter RAM memory array 1176 provides storage for the reference counters of the 1024 cache sets. The words in the Counter RAM memory array 1176 are 8 bits wide, and there are 1024 words in the Counter RAM memory array 1176, one word for each cache set. The ADDR bus to the Counter RAM memory array is 10 bits wide. Every time the CLK signal is high, the word selected by the ADDR increases by one, and the new result is immediately reflected in the DATA OUT output bus. If the Reset signal is high, the word selected by the ADDR has its value reset to zero.

Figure 12:
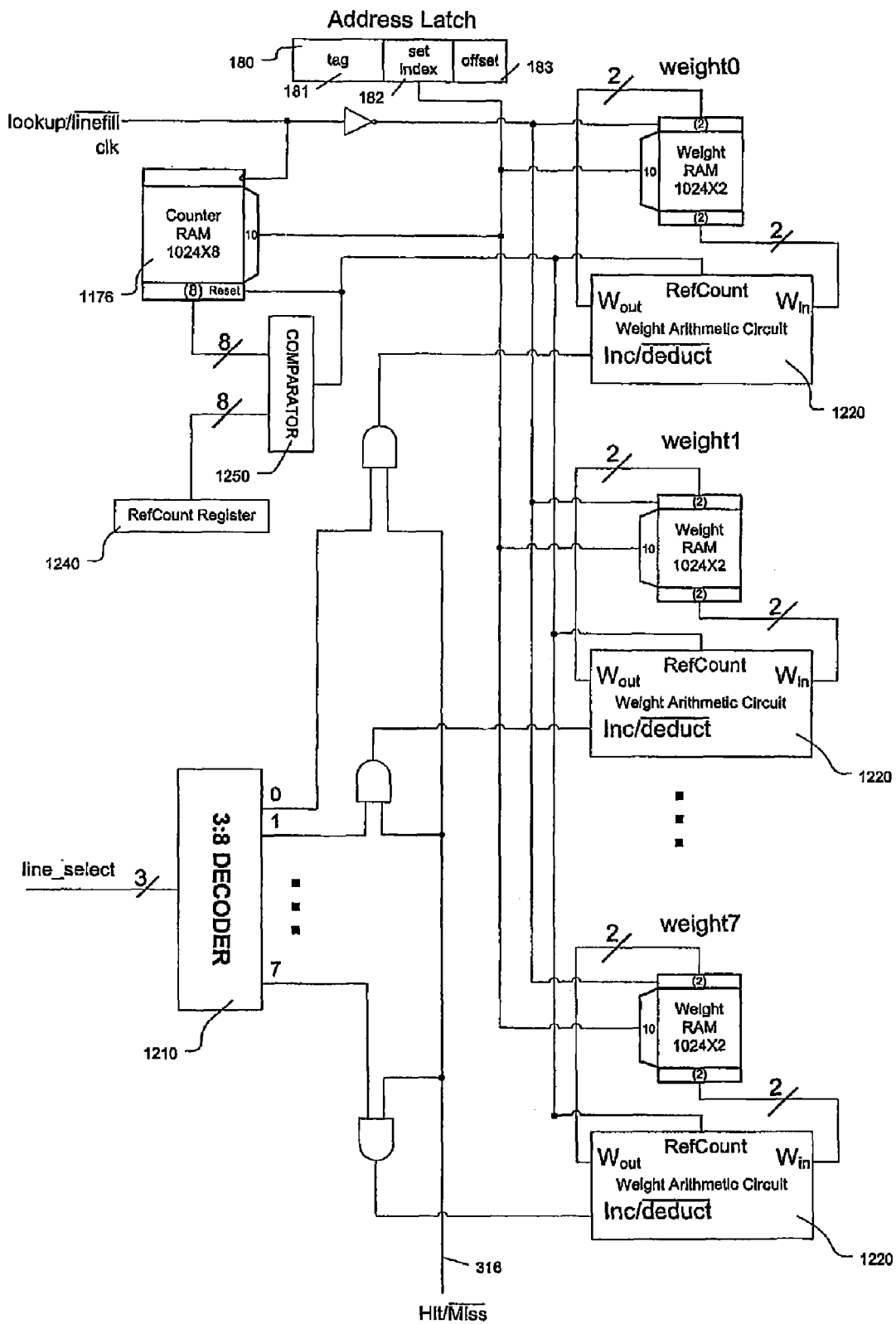
FIG. 12 is a block diagram showing the weight control logic of a CWLRU cache.

FIG. 12 is a block diagram illustrating an example weight control logic circuit of the CWLRU cache. The set index 182 part of the address latch 180 is connected to the ADDR inputs of the eight Weight RAM memory arrays 1173 and the Counter RAM memory array 1176. The Counter RAM memory array 1176 records the number of references to the selected cache set. The RefCount Register 1240 stores the threshold. The output of the Counter RAM memory array 1176 is compared at comparator 1250 with the threshold value stored in the RefCount Register 1240. In the example shown, there is only one RefCount Register 1240, although further circuitry may be added to provide for a further threshold value, as previously mentioned. If the reading of the reference counter 1230 is equal to the threshold, comparator 1250 outputs RefCount signals to eight Weight Arithmetic circuits 1220, and the word in the Counter RAM memory array 1176 is reset to zero. The RefCount Register 1240 is software configurable. It is possible to dynamically adjust the value of the RefCount Register 1240 to suit the locality of workloads.

The Hit/Miss signal from the Hit/Miss logic and the output of decoder 1210 control whether the weights of the eight cache lines are decreased or increased. CWLRU deducts the weights less frequently, and only when the reference count of the selected cache set reads the threshold, but CWLRU increases the weight of a cache line every time it is hit. In WLRU, to get good hit rates, weights are increased by a relatively large number, for example 64 or 128, and the increment of weights is controlled by the Weight Increment Register 162. In CWLRU, to save storage, the weight is always increased by one when hit, and thus there is no need for a Weight Increment Register in CWLRU. The only configurable parameter in CWLRU is the deducting frequency, which is controlled by the RefCount Register 1240.

Figure 13:
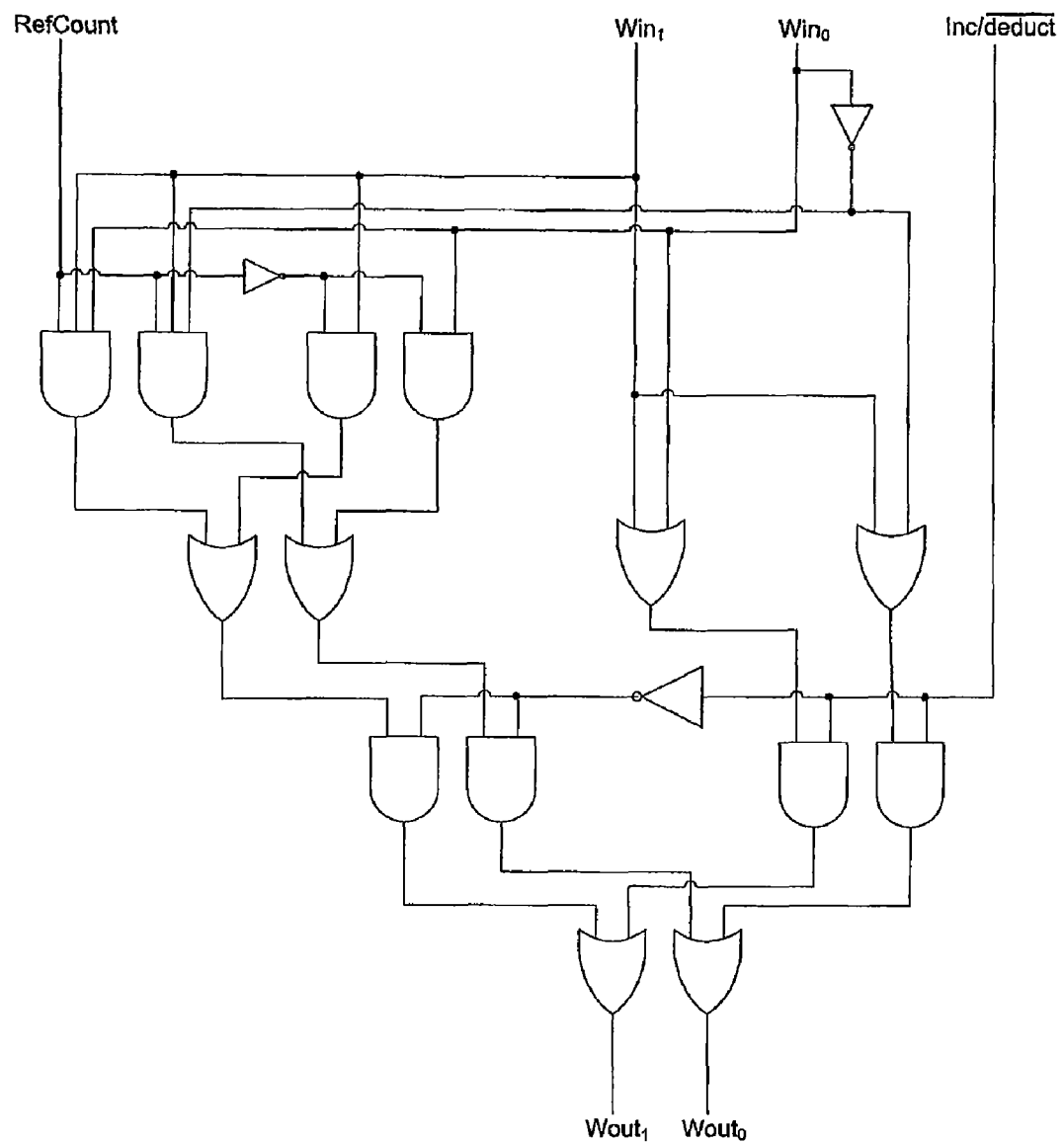
FIG. 13 is a diagram showing the weight arithmetic circuit in the weight control logic of a CWLRU cache.

FIG. 13 is a diagram showing an example weight arithmetic circuit of a CWLRU cache, which is referred to as 1220 in FIG. 12. Input signals Win0 and Win1 are the old weight, and output signals Wout0 and Wout1 are the new weight. The Weight Arithmetic circuit 1220 performs two operations: increasing and decreasing the weight. When the input signal Inc/deduct is high, it increments the old weight by one. The upper limit of weights in CWLRU is 3. If the old weight plus one is larger than 3, the new weight remains at 3. The RefCount signal does not have any effect on the increasing of weights. If hit, the weight of a cache line only increases by one (if less than 3).

If the Inc/deduct signal is low, the weight arithmetic circuit 1220 deducts the old weight by one if the RefCount signal is high. Otherwise, the weight remains the same. If the old weight is already zero, deducting it by one causes underflow. In this case, the new weight remains at zero.

Figure 14:
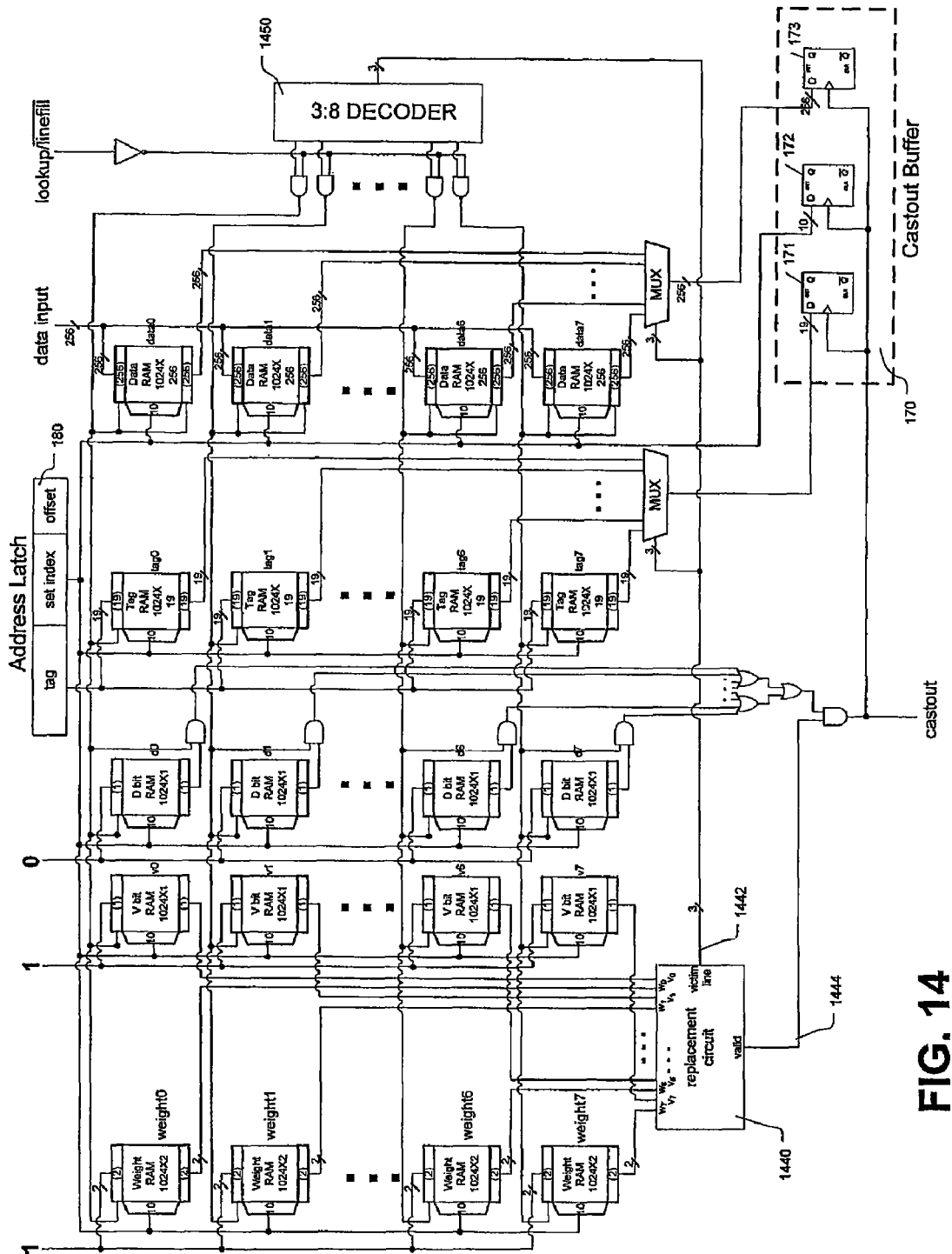
FIG. 14 is a block diagram showing the line-fill control logic of a CWLRU cache.

FIG. 14 is a block diagram illustrating an example line-fill circuit of a CWLRU cache. FIG. 14 is only slightly different from FIG. 6, in that the words in the Weight RAM memory array 1173 in CWLRU are 2 bits wide and the replacement circuit 1440 in CWLRU is different from the replacement circuit 640 in WLRU. Another difference is that there is no Initial Weight Register 164 in CWLRU, and the weight of new cache lines in CWLRU is always initialized to one.

As in a WLRU cache, the line-fill operations of a CWLRU cache are indicated by the lookupline_fill signal 194 being low. Line-fill operations begin with the replacement circuit 1440 choosing a victim cache line to be replaced. The replacement circuit 1440 first tries to find an invalid cache line and then the cache line with the minimal weight. The Victim Line signal 1442 is the number of the to-be-replaced cache line. Decoder 1450 decodes the Victim Line signal 1442 and enables writing to the RAM memory arrays of the victim cache line. Before the words in the RAM memory arrays are overwritten, the current contents of the replaced cache line are read out and possibly stored in the Cast-out Buffer 170. If the replaced cache line is valid and dirty, the Cast-out Buffer 170 is loaded.

Figure 15:
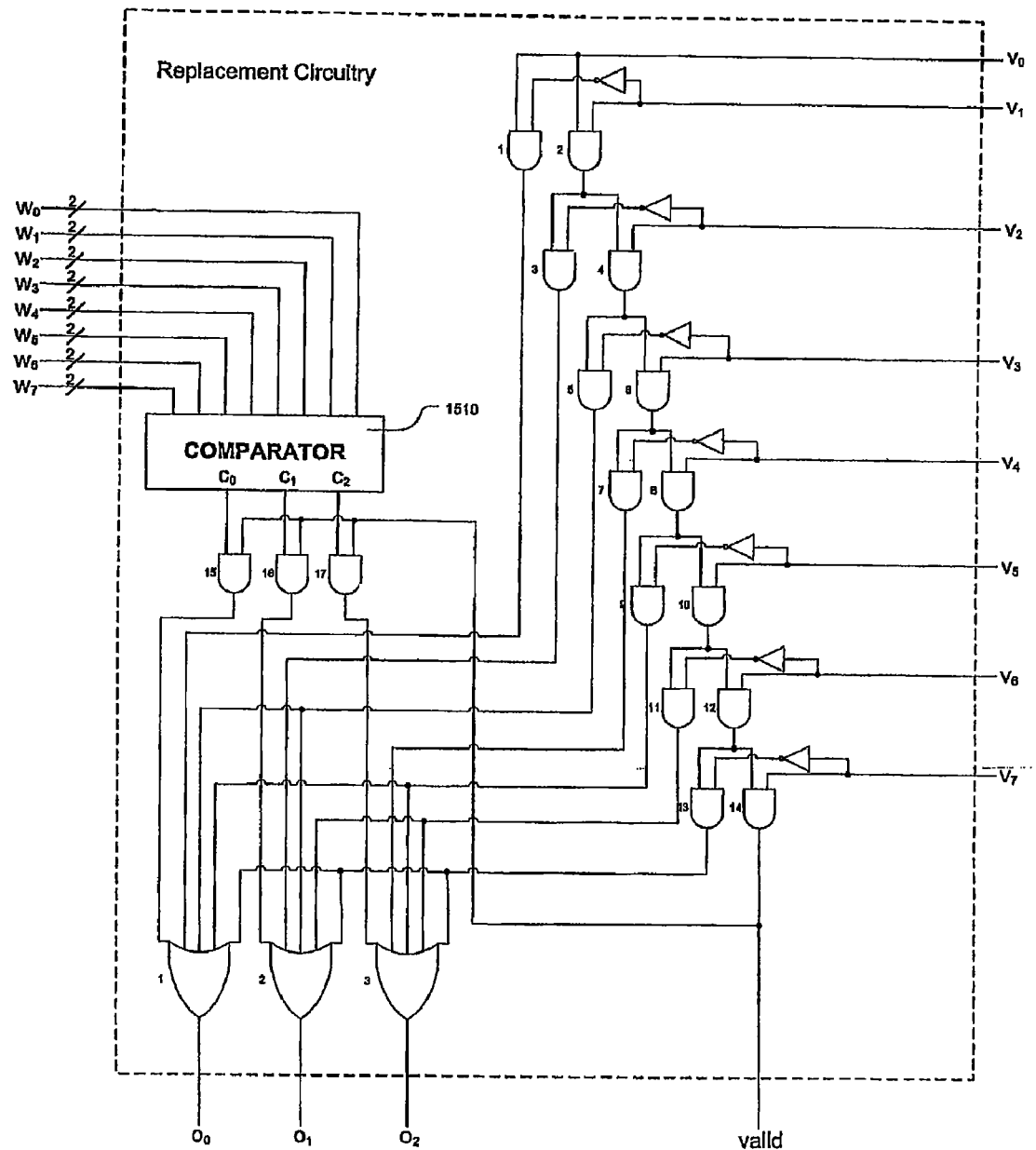
FIG. 15 is a block diagram showing the replacement control logic of a CWLRU cache.

FIG. 15 is a diagram showing the replacement circuit of a CWLRU cache, which is referred to as 1440 in FIG. 14. The replacement circuit 1440 of CWLRU is only slightly different from the replacement circuit 640 of WLRU as illustrated in FIG. 7, in that the weights being compared by the comparator 1510 are 2 bits wide, while those in FIG. 7 are 8 bits wide.

As in a WLRU cache, the replacement circuit 1440 of a CWLRU cache first tries to find an invalid cache line. The eight Valid Status RAM memory arrays 1175 are tested in order of the cache line number. If there is an invalid cache line, the number of the invalid cache line is output on $O_0$ to $O_2$. If there is more than one invalid cache line, the one with the lower line number is chosen. Comparator 1510 compares the weight0 to weight7 input lines and outputs the number of cache line with the minimal weight. The output of the comparator 1510 is not used when there are invalid cache lines. When all cache lines are valid, the output of the comparator 1510 is the final output. If the chosen line is valid, the Valid signal is set high. Otherwise it is set low.

Figure 16:
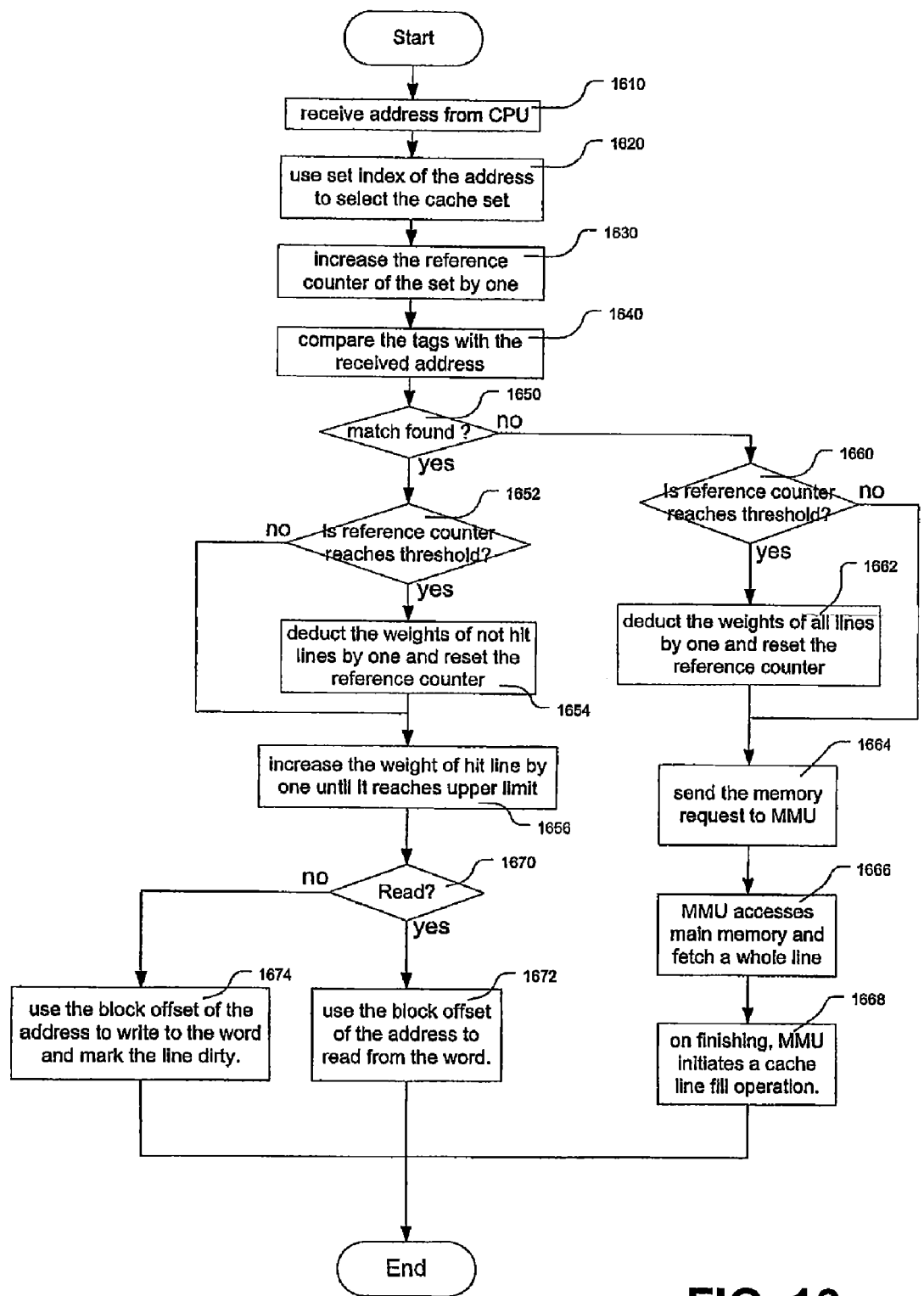
FIG. 16 is a flow chart showing the steps of a cache lookup operation of a CWLRU cache.

FIG. 16 is a flow chart showing the steps of a cache lookup process for a CWLRU cache. The flow chart in FIG. 16 is different from FIG. 9 in that the weights of the cache lines are decremented only when the word of the Counter RAM memory array 1176, representing the selected cache set, reads the predefined threshold.

The cache lookup process (or method) of the CWLRU cache begins at step 1610, at which point the address of the word is loaded into the Address Latch 180. At step 1620, the set index part 182 of the address latch 180 is used to select a single word in the Counter RAM memory array 1176, and the word is increased by one at step 1630. At step 1640, the eight address tags of the selected cache set are compared with the tag part 181 of the Address Latch 180.

At step 1650, if a matching address tag is found, it is a cache hit and step 1652 is performed. At step 1652, the word in the Counter RAM memory array 1176 representing the selected cache set is compared with the RefCount Register 1240. If they are the same, step 1654 is performed. At step 1654, the weights of all eight cache lines of the cache set (except the hit cache line) are decremented by one, and the word in the Counter RAM memory array 1176 is reset to zero. If the word in the Counter RAM memory array 1176 does not reach the value of the RefCount Register 1240, the method proceeds directly to step 1656. At step 1656, the weight of the hit cache line is increased by one until it reaches the upper limit, which is 3 in this example. If the RD/WR signal is high, indicating a cache read, at step 1672, one word of the hit cache line is read out. If the RD/WR signal is low, it is a cache write, and, at step 1674, one word of the hit cache line is overwritten and the dirty status bit of the cache line is set.

If, at step 1650, no matching address tag is found, it is a cache miss, and step 1660 is performed. At step 1660, the selected word of the Counter RAM memory array 1176 is compared against the value of the RefCount Register 1240. If they are the same, at step 1662, the weights of all cache lines are decremented by one, unless they are already zero, and the word of the Counter RAM memory array 1176 is reset to zero. If the word representing the selected cache set in the Counter RAM memory array 1176 does not reach the threshold, the weights are not changed and the method proceeds directly to step 1664. At step 1664, the memory reference request is sent to the MMU 130. The MMU 130 accesses the main memory and fetches the cache line containing the requested word at step 1666. At step 1668, when MMU 130 finishes the memory access, it initiates a cache line-fill operation. The cache line-fill operation of a CWLRU cache is substantially the same as the line-fill operation of a WLRU cache, except that the initial weight of the new cache line is always set at one.

Figure 17:
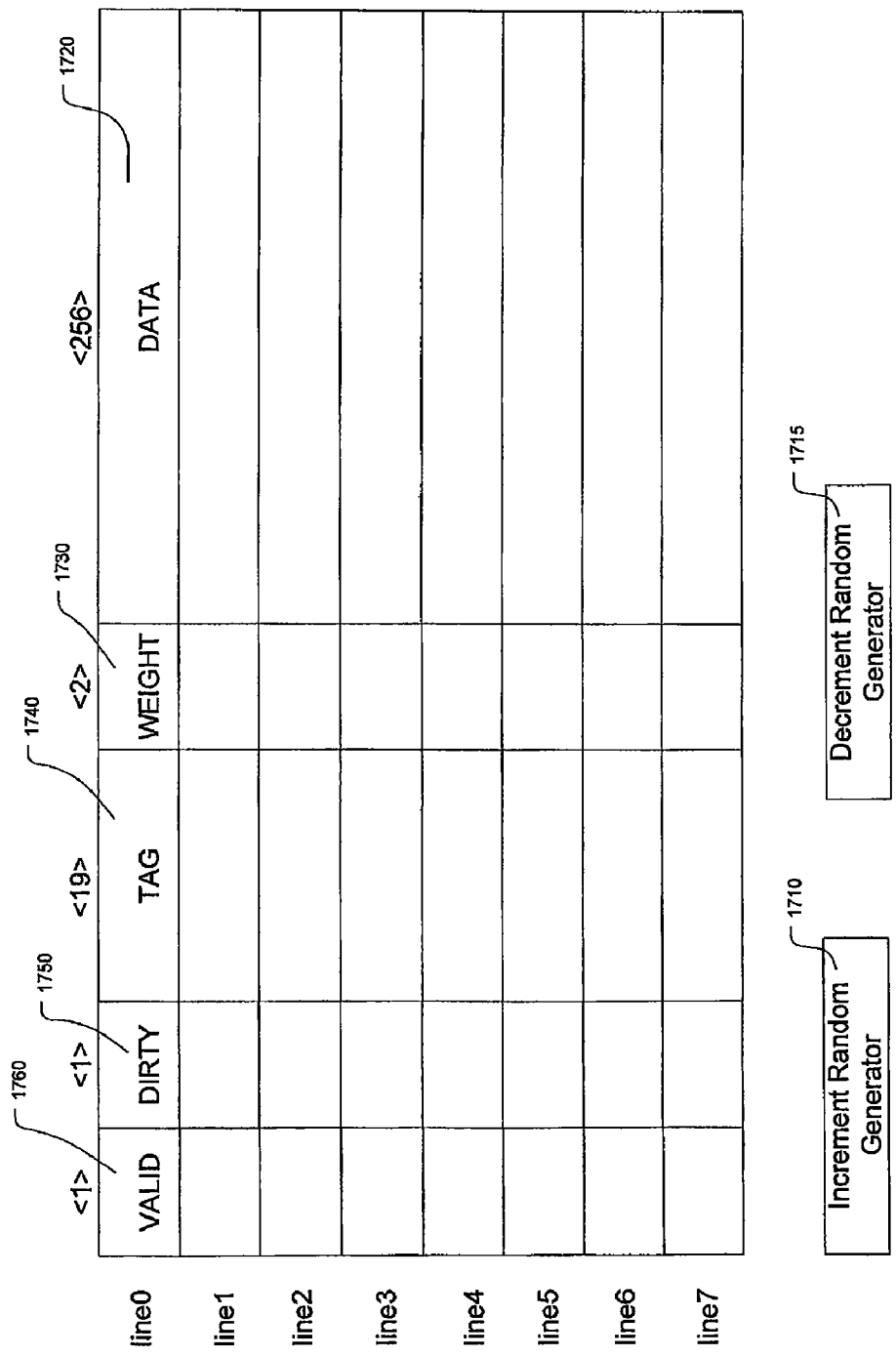
FIG. 17 is a block diagram showing the storage arrangement of a Random WLRU cache set.

FIG. 17 is a block diagram showing an example storage arrangement of a Random WLRU cache set. Every cache line requires 279 bits of storage. Of them, one bit 1750 is used for dirty status, one bit 1760 is for the valid status. Nineteen bits 1740 are used to store the address tag. Two bits 1730 are used to store the weight, and 256 bits 1720 are used to store the data of a cache line.

Besides CWLRU, there are other methods which can successfully reduce the weight storage requirement of WLRU. The weight of a cache line determines its stay time in the cache. Large weights are necessary if a cache line needs to stay long. Randomly decreasing the weight at some probability can let cache lines stay long while using only small weights. This method is called Random WLRU. Like CWLRU, the Random WLRU example in this disclosure uses as few as two bits per cache line to store the weight. Compared with CWLRU, where a counter is used and weights are decremented only when the counter reads a predefined threshold, the use of counters is avoided in Random WLRU. In this example, the Random WLRU cache has two random number generators. They are an Increment Random Generator 1710 and a Decrement Random Generator 1715. The two random generators are software configurable. In most cases, only the Decrement Random Generator 1715 is needed, and weights are decremented at some probability every reference but are increased by one at every hit.

In Random WLRU, the weights are decreased every reference at some probability, for example 10% or less. The chance that the weight of a cache line is decremented abides by a normal distribution. Once a weight is bigger than zero, it will, on average take a certain amount of time before the weight is randomly decremented to zero, given a low enough decrement probability. By controlling the probability, the random decrease of weights can mimic a wide range of weight formulas that require large weights.

To further increase the accuracy of using small storage for weights, weights can also be increased randomly according to a probability function. For even more precision, the random increasing and decreasing of weights can have different probabilities for different weight values. For example, assuming an upper limit of 3 (2 bits per weight), the probability of increasing the weight from 2 to 3 can be set at 50% for example. While, increasing of the weight from 1 to 2 can have much high probabilities. Deducting of weights can also be at different probabilities for different weight values.

Figure 18:
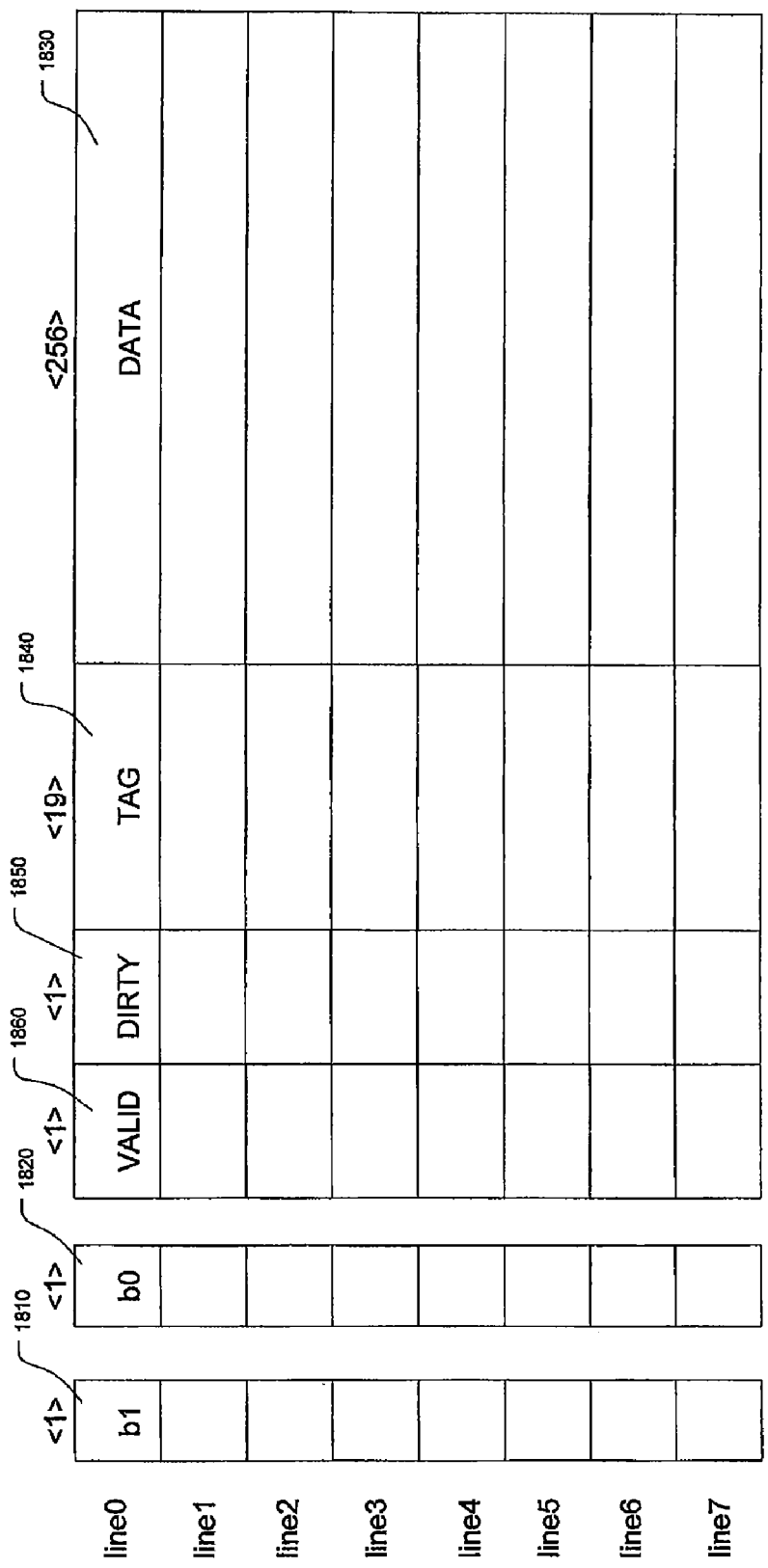
FIG. 18 is a block diagram showing the storage arrangement of a WLRU-msb cache set.

FIG. 18 is a block diagram showing an example storage arrangement of a cache set using the WLRU-msb cache replacement. Every cache line requires 279 bits of storage. Of them, one bit 1810 is used to store b1, the hit bit. One bit 1820 is used to store b0, the initial bit. One bit 1850 is used for dirty status, one bit 1860 is for the valid status. Nineteen bits 1840 are used to store the address tag and 256 bits 1830 are used to store the data of a cache line.

WLRU-msb is yet another space-efficient variant of the standard WLRU. WLRU-msb uses two bits per cache line to store the weight of a cache line. The two weight bits are indicated by b0 1820 and b1 1810. When replacing a cache line, the two bits form a two-bit number to be compared, and the cache line with the minimum weight is chosen. The setting and clearing of the two bits is operated independently. The lower bit b0 1820 is set when a cache line is first loaded, and b0 is also called the initial bit. The higher bit b1 1810 is set when a cache line is hit, and b1 is also called the hit bit. When a cache line is first brought into the cache, the hit bit, b1 1810, is not set.

The name WLRU-msb comes from the Pseudo-LRU-msb or PLRU-msb replacement, because the way the b0 and b1 in WLRU-msb are cleared is similar to the Pseudo-LRU-msb replacement. The 'msb' of WLRU-msb and PLRU-msb stands for "most significant bit". In PLRU-msb replacement, one bit per cache line is used to indicate the cache lines most recently referenced, and these bits are called the msb bits. The msb bit is set if the cache line has just been referenced, whether the cache line is first brought into the cache or hit. When replacing a cache line, the cache line with its msb bit cleared is chosen. If all cache lines have their msb bits set when a new cache line is to be loaded or some cache line is hit, all the msb bits except the just referenced cache line are cleared. Thus, only the just referenced cache line has its msb bit set, and the cache line will be replaced later than all other cache lines.

Different from PLRU-msb, WLRU-msb has two bits per cache line. The initial bit, b0 1820, is cleared for certain cache line replacements and the clearing of the initial bit is done independently of the clearing of the hit bit. Unlike WLRU where weights are decreased each time there is a reference, WLRU-msb decreases the initial bit of the weight during certain replacements. When a new cache line is to be loaded and the initial bits of all cache lines are set, the initial bits of all cache lines except the new cache line are cleared, and only the new cache line has its initial bit, b0, set.

When one cache line is hit, it has its hit bit, b1 1810, set. If all cache lines have their hit bits set when a cache line is hit, the hit bits of all cache lines except the just hit line are cleared. If there are some cache lines whose hit bits are zero, then just the hit cache line has its own hit bit set. The hit bits of other cache lines are not cleared. When clearing the hit bits, the lower bit b0 1820 may alternatively be set allowing cache lines with a hit history to stay in the cache longer.

When one or more cache lines needs to be replaced, the cache lines having hit bits that are not set will be replaced before those with their hit bits set. The hit bit and the initial bit of a cache line form a two-bit number, the hit bit being the most significant bit. For example, if both bits of a cache line are cleared, the bits forms the number zero, or 00 in binary format. This is the smallest possible number. If a cache line has its hit bit cleared and its initial bit set, its number is 1, or 01 in binary format. If a cache line has its hit bit set but initial bit cleared, it forms the number 2, or 10 in binary format. If both bits are set, its number is 3, or 11 in binary format. When a replacement is necessary, the cache line with the lowest number will be chosen. If more than one cache line has the lowest number, an arbitrarily selected cache line is replaced.

While various features and functions of embodiments of the invention are described herein, it should be understood that various enhancements or modifications to the described features and functions may be employed, while remaining within the spirit and scope of the invention. In particular, the various bit lengths and bus sizes may be varied, depending on requirements. All such enhancements or modifications are intended to fall within the spirit and scope of the invention.

Figure 19:
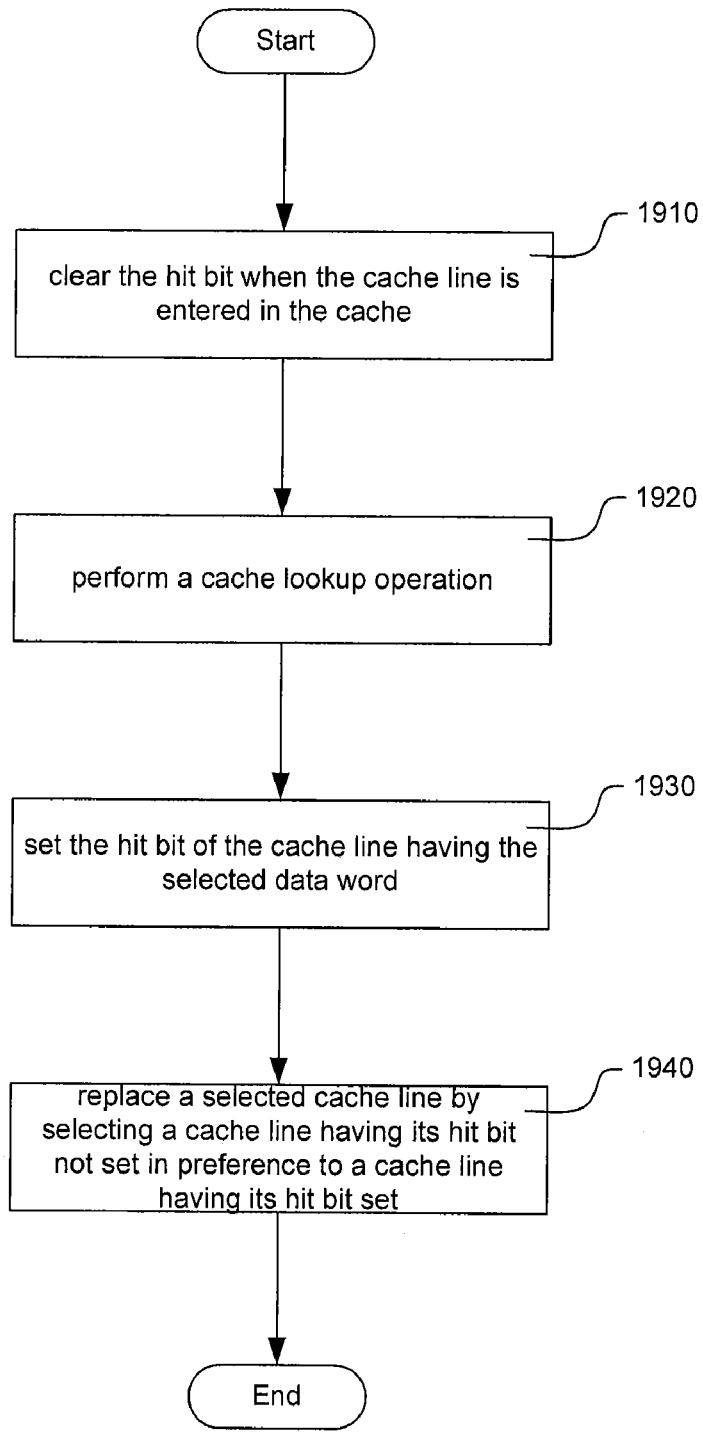

FIG. 19 is a flow chart showing the steps of a method of managing a cache in a computer system. The cache has a plurality of cache lines and each cache line has one or more data words and a hit bit, b1 1810. In accordance with some embodiments of the present invention, each cache line also has an initial bit, b0 1820. The setting and clearing of the hit bit and the initial bit are operated independently.

At step 1910, when a cache line is first entered into the cache the hit bit is cleared. In accordance with some embodiments of the present invention where each cache line also has an initial bit, when a cache line is entered into the cache the initial bit is set.

At step 1920, a cache lookup operation is performed to determine whether a selected data word is stored in a cache line within a selected portion of the cache.

At step 1930, when the cache lookup operation determines that the selected data word is stored within the selected portion of the cache, the hit bit of the cache line having the selected data word is set. In accordance with some embodiments of the present invention, if the hit bit of each cache line in the selected portion of the cache is set, the hit bit of each cache line in the selected portion of the cache is cleared except the cache line having the selected data word. In accordance with further embodiments of the present invention, when the hit bit of each cache line in the selected portion of the cache is cleared the initial bits of the cache lines are set.

At step 1940, a selected cache line in the selected portion of the cache is replaced by selecting as the selected cache line a cache line having its hit bit not set in preference to a cache line having its hit bit set. In accordance with some embodiments of the present invention, the replacement at step 1940 occurs when the cache lookup session determines that the selected data word is not stored within the selected portion of the cache.

In accordance with embodiments of the present invention where each cache line also has an initial bit 1820, the replacement at step 1940 may further involve selecting as the selected cache line a cache line having its initial bit not set in preference to a cache line having its initial bit set.

In accordance with further embodiments of the present invention, the selected cache line is a cache line with the lowest two bit binary number formed by the hit bit and the initial bit where the hit bit is the most significant bit and the initial bit is the least significant bit.

In accordance with even further embodiments of the present invention, if the initial bit of each cache line in the selected portion of the cache is set, then the replacement at step 1940 further involves clearing the initial bit of each cache line in the selected portion of the cache except the selected cache line.

What is claimed is:

1. A method of managing a cache in a computer system, the cache having a plurality of cache lines, each cache line having one or more data words and a hit bit, comprising:
   clearing the hit bit of each cache line when the respective cache line is entered in the cache;
   performing a cache lookup operation to determine whether a selected data word is stored in a cache line within a selected portion of the cache;
   setting the hit bit of the cache line having the selected data word when the cache lookup operation determines that the selected data word is stored within the selected portion of the cache; and
   replacing a selected cache line in the selected portion of the cache wherein the replacing comprises selecting as the selected cache line a cache line having its hit bit not set in preference to a cache line having its hit bit set.

2. The method of claim 1, wherein the replacing occurs when the cache lookup operation determines that the selected data word is not stored within the selected portion of the cache.

3. The method of claim 1, wherein each cache line has an initial bit and wherein the replacing comprises selecting as the selected cache line a cache line having its initial bit not set in preference to a cache line having its initial bit set.

4. The method of claim 3, further comprising setting the initial bit of each cache line when it is entered in the cache.

5. The method of claim 3, wherein the selected cache line is a cache line with the lowest two bit binary number formed by the hit bit and the initial bit where the hit bit is the most significant bit and the initial bit is the least significant bit.

6. The method of claim 3, wherein replacing a selected cache line further comprises, if the initial bit of each cache line in the selected portion of the cache is set, clearing the initial bit of each cache line in the selected portion of the cache except the selected cache line.

7. The method of claim 1, wherein setting the hit bit further comprises, if the hit bit of each cache line in the selected portion of the cache is set, clearing the hit bit of each cache line in the selected portion of the cache except the cache line having the selected data word.

8. The method of claim 7, wherein clearing the hit bit further comprises setting the initial bit.

9. Computer readable storage storing computer readable program instructions, which, when executed by a processor, cause the processor to perform the method of claim 1.

10. A method of managing a cache in a computer system having a plurality of cache lines, each cache line having one or more data words and a hit bit, comprising:
    using first circuitry to clear the hit bit of each cache line when the respective cache line is entered in the cache;

using second circuitry to perform a cache lookup operation to determine whether a selected data word is stored in a cache line within a selected portion of the cache;

using third circuitry to set the hit bit of the cache line having the selected data word when the cache lookup operation determines that the selected data word is stored within the selected portion of the cache; and using forth circuitry to replace a selected cache line in the selected portion of the cache, wherein the replacing comprises selecting as the selected cache line a cache line having its hit bit not set in preference to a cache line having its hit bit set.

11. The method of claim 10, wherein using the forth circuitry to replace occurs when the cache lookup operation determines that the selected data word is not stored within the selected portion of the cache.

12. The method of claim 10, wherein each cache line has an initial bit and wherein using the forth circuitry to replace comprises selecting as the selected cache line a cache line having its initial bit not set in preference to a cache line having its initial bit set.

13. The method of claim 12, further comprising using fifth circuitry to set the initial bit of each cache line when it is entered in the cache.

14. The method of claim 12, wherein the selected cache line is a cache line with the lowest two bit binary number formed by the hit bit and the initial bit where the hit bit is the most significant bit and the initial bit is the least significant bit.

15. The method of claim 12, wherein using the forth circuitry to replace a selected cache line further comprises, if the initial bit of each cache line in the selected portion of the cache is set, using fifth circuitry to clear the initial bit of each cache line in the selected portion of the cache except the selected cache line.

16. The method of claim 10, wherein using the third circuitry to set the hit bit further comprises, if the hit bit of each cache line in the selected portion of the cache is set, using the first circuitry to clear the hit bit of each cache line in the selected portion of the cache except the cache line having the selected data word.

17. The method of claim 16, wherein using the first circuitry to clear the hit bit further comprises setting the initial bit.

* * * * *